(12) United States Patent
Watarai et al.

(10) Patent No.: US 7,351,498 B2
(45) Date of Patent: Apr. 1, 2008

(54) LITHIUM ION POLYMER SECONDARY BATTERY ITS ELECTRODE AND METHOD FOR SYNTHESIZING POLYMER COMPOUND IN BINDER USED IN ADHESION LAYER THEREOF

(75) Inventors: Yusuke Watarai, Naka-gun (JP); Akio Minakuchi, Naka-gun (JP); Akihiro Higami, Naka-gun (JP); Shoubin Zhang, Naka-gun (JP); Tadashi Kobayashi, Minamisaitama-gun (JP); Sawako Takeuchi, Saitama (JP)

(73) Assignee: Mitsubishi Materials Corporation, Tokyo (JP)

( * ) Notice: Subject to any disclaimer, the term of this patent is extended or adjusted under 35 U.S.C. 154(b) by 272 days.

(21) Appl. No.: 10/474,354

(22) PCT Filed: Apr. 10, 2002

(86) PCT No.: PCT/JP02/03573

§ 371 (c)(1),
(2), (4) Date: Jun. 7, 2004

(87) PCT Pub. No.: WO02/084764

PCT Pub. Date: Oct. 24, 2002

(65) Prior Publication Data

US 2004/0234850 A1    Nov. 25, 2004

(30) Foreign Application Priority Data

Apr. 10, 2001  (JP) ............................ 2001-111126
Sep. 28, 2001  (JP) ............................ 2001-303053
Sep. 28, 2001  (JP) ............................ 2001-303054

(51) Int. Cl.
*H01M 4/62*   (2006.01)

(52) U.S. Cl. ............... 429/217; 252/182.1; 429/231.95

(58) Field of Classification Search ................ 429/217, 429/232, 212, 218.1, 231.95; 252/182.1
See application file for complete search history.

(56) References Cited

U.S. PATENT DOCUMENTS 5,441,830 A    8/1995  Moulton et al.

(Continued)

FOREIGN PATENT DOCUMENTS

EP           793286        9/1997

(Continued)

OTHER PUBLICATIONS

Patent Abstracts of Japan, JP 10-144298, May 29, 1998 (reference previously filed in Japanese Language on Oct. 9, 2003).

*Primary Examiner*—Patrick Joseph Ryan
*Assistant Examiner*—Monique Wills
(74) *Attorney, Agent, or Firm*—Oblon, Spivak, McClelland, Maier, Neustadt, P.C.

(57) ABSTRACT

The present invention provides a lithium ion polymer battery comprising an electrode having excellent adhesion and electrical conductivity between a current collector and an active material layer, cycle capacity maintaining characteristics being improved, wherein a bonding layer, which bonds the current collector to the active material layer, is stable to an organic solvent in an electrolytic solution and is excellent in storage stability, and also, it is made possible to suppress the corrosion of the current collector by a strong acid such as hydrofluoric acid generated in the battery.

30 Claims, 6 Drawing Sheets

U.S. PATENT DOCUMENTS

| | | |
|---|---|---|
| 5,464,707 A | 11/1995 | Moulton et al. |
| 5,900,183 A | 5/1999 | Kronfli et al. |
| 6,007,588 A | 12/1999 | Mitchell |
| 6,617,074 B1 | 9/2003 | Watarai et al. |

FOREIGN PATENT DOCUMENTS

| | | |
|---|---|---|
| JP | 10-144298 | 5/1998 |
| JP | 10-302799 | 11/1998 |
| JP | 2002-15726 | 1/2002 |
| WO | WO 97/32347 | 9/1997 |

LITHIUM ION POLYMER SECONDARY BATTERY ITS ELECTRODE AND METHOD FOR SYNTHESIZING POLYMER COMPOUND IN BINDER USED IN ADHESION LAYER THEREOF

TECHNICAL FIELD

The present invention relates to a lithium ion polymer secondary battery which has a bonding layer between a current collector of an electrode and an active material, and a method for synthesizing a binder used in the bonding layer of the battery.

BACKGROUND ART

In recent years, thin batteries have been in increasing demand with the spread of portable devices, such as video cameras and laptop computers. A typical thin battery is a lithium ion polymer secondary battery which is formed by laminating a positive electrode and a negative electrode. The positive electrode is made by forming a positive electrode active material layer on the surface of a sheet-like positive electrode current collector, and the negative electrode is made by forming a negative electrode active material layer on the surface of a sheet-like negative electrode current collector. An electrolyte layer is interposed between the positive electrode active material layer and the negative electrode active material layer. In this battery, a positive electrode terminal and a negative electrode terminal are provided on the positive electrode current collector and the negative electrode current collector, respectively, for leading out a current generated by a potential difference between the two active materials, and the laminate formed thereby is hermetically sealed in a package so as to form the lithium ion polymer secondary battery. The lithium ion polymer secondary battery uses the positive electrode terminal and the negative electrode terminal which lead out of the package as the battery terminals to provide predetermined electrical output.

The lithium ion polymer secondary battery having such a structure has high battery voltage and high energy density, and it is viewed as very promising. Bonding layers are often interposed between the current collectors and the active material layers. Characteristics which the bonding layer is required to have include sufficient force of adhesion with the current collector material, sufficient force of bonding with the binder contained in the active material layer, stability in the presence of an organic solvent in the electrolytic solution, excellent long-term storage stability, thermal stability to remain without peeling when exposed to high temperature and electrochemical stability to endure repetitive charge-discharge cycles, but there has not been a solution that meets these requirements.

For example, it is necessary to increase the surface areas of the positive electrode sheet and the negative electrode sheet in order to further increase the discharge capacity of the lithium ion polymer secondary battery. However, simply increasing the surface areas of the positive electrode sheet and the negative electrode sheet has a drawback of making the electrodes difficult to handle because of the large surface areas. Solutions may be conceived for this problem, such as folding or winding the large positive electrode sheet and negative electrode sheet to a predetermined size. When the positive electrode sheet or the negative electrode sheet are folded or wound in a laminated state, the positive electrode sheet or the negative electrode sheet is bent along the folding line, thus causing the positive electrode sheet or the negative electrode sheet to peel off from the electrolyte layer, such as polymer electrolyte layer, which leads to a decrease in the effective surface area of the interface between the electrode and the electrolyte, resulting in decreasing charge capacity and internal resistance of the battery, thus deteriorating the cycle characteristics of the charge capacity. Also, there has been a problem in that the current collector peels off the active material layer formed on the positive electrode sheet and the negative electrode sheet due to bending along the folding line. Moreover, there has been a problem in that the positive and negative electrode active material layers expand and contract as the positive and negative electrode active material layers store and release lithium ions in the charge and discharge cycles, resulting in a stress that causes the active material layer to peel off the current collector. To solve the problems described above, a method has been proposed such as a bonding layer being formed between the active material layer and the current collector so as to prevent the layers from peeling off and adhesion from being reduced by means of the bonding layer.

The bonding layers, that are interposed between the positive electrode active material layer and the positive electrode current collector and between the negative electrode active material layer and the negative electrode current collector, are required to have both the function of holding the two members together and the function of providing electrical conductivity, and are therefore formed by dispersing an conductive substance in a polymer material used as a binder that holds the two members together.

Prior art techniques that aim to solve the problems described above include one in which a bonding layer is interposed between the active material layer and the current collector so as to prevent the layers from peeling off and adhesion from being reduced by means of the bonding layer, as disclosed in the prior art documents (1) to (5) as follows: (1) Japanese Examined Patent Publication No. 7-70328 discloses a current collector coated with a conductive film mentions of a binder and a conductive filler. This invention names phenol resin, melamine resin, urea resin, vinyl resin, alkyd resin, synthetic rubber and the like as the binder material. (2) Japanese Unexamined Patent Publication No. 9-35707 discloses a constitution in which a negative electrode material layer containing a binder made of powdered carbon and polyvinylidene fluoride (hereinafter referred to as PVdF) is formed on the negative electrode current collector, and a binder layer made of an acrylic copolymer containing a conductive substance mixed therein is formed on the negative electrode current collector. This invention achieves a high bonding effect by using the acrylic copolymer having high strength of bonding with copper for the negative electrode plate whereon the negative electrode current collector is formed from a copper foil. (3) Japanese Unexamined Patent Publication No. 10-149810 discloses a constitution in which an undercoat layer is formed by applying a polyurethane resin or an epoxy resin between the active material layer and the current collector. This invention improves adhesion between the active material layer and the current collector in the electrode by forming the undercoat layer from polyurethane resin or epoxy resin, thereby improving the cycle capacity maintaining characteristics of the battery.

(4) Japanese Unexamined Patent Publication No. 10-144298 discloses a constitution as a bonding layer made of graphite and a binder between the negative electrode current collector and the negative electrode active material layer. According to this invention, graphite contained in the bonding layer improves the efficiency of the negative electrode in accumulating charge. (5) Japanese Unexamined Patent Publication No. 9-213370 discloses a constitution in which graft-polymerized PVdF is used as a binder for the electrolyte portion and the electrolyte layer of the battery active material. This invention improves the efficiency of making contact with the current collector by using graft-polymerized PVdF as a binder for the electrolyte portion and the electrolyte layer of the battery active material.

Characteristics which the bonding layer is required to have include sufficient force of adhesion with the current collector material, sufficient force of bonding with the binder contained in the active material layer, stability in the presence of an organic solvent in the electrolytic solution, excellent long-term storage stability, thermal stability to remain without peeling when exposed to high temperature and electrochemical stability to endure repeated charge-discharge cycles.

However, the technique (1) has a problem in that butyl rubber, phenol resin or the like used as the binder is corroded with the electrolytic solution and peels off. In the technique (2), although adhesive strength between the negative electrode current collector and the negative electrode material layer can be increased by forming the bonding layer containing, as a major component, acrylic copolymer containing a conductive substance mixed therein between the negative electrode current collector and the negative electrode material layer because an acrylic copolymer has high strength of bonding with PVdF contained in the negative electrode material layer and the negative electrode current collector, there has been a problem in that the acrylic copolymer is corroded by the electrolytic solution and the negative electrode current collector peels off the negative electrode material. Although the technique (3) is claimed to increase the peel-off resistance and the number of 80% capacity cycles in the case in which polyurethane resin is used as the undercoat layer, the effect is not practically sufficient. When an epoxy resin is used, the epoxy resin is corroded by the electrolytic solution, and therefore there is a possibility that the active material layer will peel off the current collector.

In the technique (4), although satisfactory adhesive strength between the bonding layer and the active material is achieved since the bonding layer includes a material similar to the binder contained in the active layer, the strength of bonding with the current collector is not satisfactory, and it is comparable to that in a case in which the active material layer is formed directly on the current collector. Also, because the electrolytic solution infiltrates the binder, there is a problem of weak bonding strength between the bonding layer and the current collector. In the technique (5), the active material layer can be formed directly on the current collector without using a bonding layer since the graft-polymerized material that has high strength of bonding with the current collector is used as the binder of the active material layer, but it has a drawback in that solvents that can be used are limited since the polymer is difficult to dissolve. Also, because it is difficult to completely remove the solvent from the inside of the battery, there is a possibility that the solvent remaining in the battery will cause an adverse effect on the battery performance.

In the second prior art technique to solve the problems described above, powdered carbon is dispersed as a conductive material in the bonding layer. However, the powdered carbon does not provide sufficient electrical conductivity, and it is necessary to increase the weight ratio of the powdered carbon to the binder, (powdered carbon/binder), in order to obtain satisfactory electrical conductivity. When the proportion of the powdered carbon in the bonding layer is increased, the proportion of the binder in the bonding layer decreases and the contact area of the binder with the current collector and the active material layer decreases due to the large volume of the powdered carbon, thus resulting in insufficient adhesive strength.

As the third prior art technique to solve the problems described above, a battery electrode is disclosed in which a bonding layer is formed in a pattern of dots, stripes, or a grid between the current collector and the active material layer (Japanese Unexamined Patent Publication No. 11-73947). The battery electrode is provided with a paint to form the bonding layer applied thereto by spraying or printing. The area in which the paint of the bonding layer is applied is in a range from 30 to 80% of the active material holding area of the current collector.

In the battery electrode constituted as described above, since the bonding layer is formed in a predetermined pattern between the current collector and the active material layer, adhesion between the two members can be improved without impeding the exchange of electrons between the current collector and the active material layer, thereby improving the cycle characteristics. Specifically, adhesion between the current collector and the active material layer is maintained by the bonding layer that has the predetermined coating pattern, so that the exchange of electrons between the current collector and the active material layer is carried out smoothly in portions that are not coated, thereby keeping the electrical resistance low.

As another technique that belongs to the third prior art technique described above, a battery electrode is disclosed in which a binder that constitutes the electrode is uniformly dispersed in the electrode material (Japanese Unexamined Patent Publication No. 7-6752). This electrode is produced by forming an electrode containing a binder material dispersed therein on a current collector and drying the electrode, followed by pressure forming and further heat treatment.

A high performance secondary battery having excellent charge capacity characteristics, particularly cycle characteristics, can be produced by using the electrode that has the constitution specified in the two documents as described above.

However, among the third prior art techniques described above, the battery electrode of the prior art described in Japanese Unexamined Patent Publication No. 11-73947 requires it to form the bonding layer in a pattern of dots, stripes, or a grid, and there is a problem in that it is very difficult to form the bonding layer. Also, there remains a problem in that, in the case in which the area of portions which are not coated, where electrons are exchanged between the current collector and the active material layer, is relatively large, sufficient adhesion cannot be maintained in the portions and peel-off occurs.

In the electrode of the prior art disclosed in Japanese Unexamined Patent Publication No. 7-6752, the polymer used as the binder or the polymer electrolyte that provides binding effect is completely dissolved in the solvent, and this is mixed uniformly with other materials such as carbon and the active material, thereby preparing a coating slurry. As a result, sufficient adhesive strength cannot be achieved between the current collector and the active material layer, thus the problem of decreasing charge/discharge cycle characteristics of the battery remains to be solved. This problem is supposed to be due to the presence of a large quantity of powdered material, such as carbon, that is added to the coating slurry, in the interface between the current collector and the active material layer.

DISCLOSURE OF THE INVENTION

A first object of the present invention is to provide a lithium ion polymer secondary battery which is excellent in adhesion and electrical conductivity between the positive electrode current collector and the positive electrode active material layer and between the negative electrode current collector and the negative electrode active material layer, and also has improved cycle capacity maintaining characteristics.

A second object of the present invention is to provide a lithium ion polymer secondary battery in which a bonding layer interposed between the positive electrode current collector and the positive electrode active material layer or between the negative electrode current collector and the negative electrode active material layer is stable in the presence of an organic solvent in an electrolytic solution, and has excellent long-term storage stability.

A third object of the present invention is to provide a lithium ion polymer secondary battery capable of suppressing the corrosion of the current collector with a strong acid such as hydrofluoric acid generated in the battery.

A fourth object of the present invention is to provide a method for synthesizing a binder used in a bonding layer of a lithium ion polymer secondary battery which is excellent in adhesion and electrical conductivity due to the bonding layer interposed between the positive electrode current collector and the positive electrode active material layer or between the negative electrode current collector and the negative electrode active material layer.

A fifth object of the present invention is to provide an electrode for a secondary battery which is excellent in adhesion and electrical conductivity between the current collector and the active material layer and is capable of improving the cycle capacity maintaining characteristics of the secondary battery, and a secondary battery that uses the electrode.

A first aspect of the present invention is a lithium ion polymer secondary battery comprising a positive electrode comprising a positive electrode current collector, and a positive electrode active material layer, which contains a first binder containing a polymer compound and a positive electrode active material, provided on the surface of the positive electrode current collector; a negative electrode comprising a negative electrode current collector, and a negative electrode active material layer which contains a second binder containing a polymer that is the same as or different from that of the first binder, and a negative electrode active material, provided on the surface of the negative electrode current collector; and an electrolyte, wherein a first bonding layer is interposed between the positive electrode current collector and the positive electrode active material layer, and a second bonding layer is interposed between the negative electrode current collector and the negative electrode active material layer, the first and second bonding layers contain both a third binder and a conductive material, while the third binder contains a polymer compound obtained by modifying either or both of the polymer compounds contained in the first and second binders or a polymer compound having any of repeating units of the polymer compounds, with modifying material.

According to the first aspect of the present invention, since the polymer compound contained in the third binder, which is contained in the first and second bonding layer, is a polymer compound obtained by modifying either or both of the polymer compounds contained in the first and second binders which are contained in the positive electrode active material layer or the negative electrode active material layer, or a polymer compound having any of repeating units of the polymer compounds with modifying material, the bonding layers have high force of adhesion with the positive electrode active material layer or the negative electrode active material layer. Adhesion of the bonding layers to the positive electrode current collector and the negative electrode current collector is also remarkably improved because the third binder contains a polymer compound obtained by modifying either or both of the polymer compounds contained in the first and second binders or a polymer compound having any of repeating units of the polymer compounds with modifying material.

A second aspect of the present invention is a lithium ion polymer secondary battery comprising a positive electrode formed by providing a positive electrode active material layer containing a first binder and a positive electrode active material on the surface of the positive electrode current collector, and a negative electrode formed by providing a negative electrode active material layer containing a second binder which is the same as or different from the first binder and a negative electrode active material layer on the surface of the negative electrode current collector, wherein a first bonding layer is interposed between the positive electrode current collector and the positive electrode active material layer, a second bonding layer is interposed between the negative electrode current collector and the negative electrode active material layer, the first and second bonding layers contain both the third binder and the conductive material, and the third binder contains a polymer compound obtained by modifying a fluorine-containing polymer with a modifying material.

According to the second aspect, since the third binder contains a polymer compound obtained by modifying the fluorine-containing polymer compound with a modifying material, adhesion of the bonding layers to the positive electrode current collector or the negative electrode current collector is remarkably improved compared with the binder of the prior art.

In the first aspect, either or both of the polymers contained in the first and second binders is preferably a fluorine-containing polymer compound. This fluorine-containing polymer compound, or the fluorine-containing polymer used in the third binder in accordance with the second or third aspect of the invention is more preferably a fluorine-containing polymer compound selected from polytetrafluoroethylene, polychlorotrifluoroethylene, PVdF, polyvinylidene fluoride-hexafluoropropylene copolymer and polyvinyl fluoride.

The fluorine-containing polymer compound is preferably polytetrafluoroethylene or PVdF because of high durability to the electrolytic solution.

In the first or second aspect, the modifying material is preferably selected from ethylene, styrene, butadiene, vinyl chloride, vinyl acetate, acrylic acid, methyl acrylate, methyl vinyl ketone, acrylamide, acrylonitrile, vinylidene chloride, methacrylic acid, methyl methacrylate, and isoprene, because good adhesion with the current collector can be obtained.

More preferably, the modifying material is acrylic acid, methyl acrylate, methacrylic acid or methyl methacrylate.

In the first or second aspect, the thickness of the first and second bonding layers is preferably from 0.5 to 30 μm.

When the thickness of the first and second bonding layers is less than 0.5 μm, the ability to protect the current collector decreases, resulting in lower cycle characteristics of discharge capacity. It also makes it difficult to disperse the conductive powder uniformly when forming the first and second bonding layers, resulting in an increase in the impedance. When the thickness of the first and second bonding layer is more than 30 μm, since the volume and weight of the portion which does not contribute to the battery reaction increases, energy density per unit volume and unit weight decreases. The thickness of the bonding layers is preferably from 1 to 15 μm.

In the first or second aspect, it is preferable to contain 0.1 to 20% by weight of a dispersant in the first and second bonding layers.

By adding 0.1 to 20% by weight of the dispersant in the first and second bonding layers, it is made possible to uniformly disperse the electrical conductive material in the first and second bonding layers. Examples of the dispersant include acidic polymer dispersant, basic polymer dispersant and neutral polymer dispersant. When the content of the dispersant is less than 0.1% by weight, there is no difference in the dispersion of the electrical conductive material from that in a case without the dispersant, and the effect of adding the agent cannot be obtained. Adding more than 20% by weight of the dispersant does not make a difference in the dispersion of the electrical conductive material and does not contribute to the battery reaction, and there is no need to add an excessive amount of the dispersant. The content of the dispersant is more preferably from 2 to 15% by weight.

In the first or second aspect, it is preferable that particle size of the conductive material be from 0.5 to 30 μm, a carbon material having a graphitization degree of 50% or more is used as the conductive material, and a weight ratio of the third binder to the conductive material contained in the first and second bonding layers, (third binder/conductive material), is from 13/87 to 50/50.

When the weight ratio is less than 13/87, the proportion of the third binder in the bonding layer is too low to obtain sufficient adhesive strength. When the weight ratio is higher than 50/50, the proportion of the conductive material in the bonding layer is too low to provide for sufficient electron mobility between the current collector and the active material layer, resulting in increased internal impedance. The weight ratio of the third binder to the conductive material is more preferably from 14/86 to 33/67.

A third aspect of the present invention is a method for synthesizing the third binder contained in the bonding layer of the lithium ion polymer secondary battery, wherein the third binder is synthesized by modifying (a) either or both of the polymer compounds contained in the first and second binders in the first aspect, or (b) the polymer compound having any of repeating units of the polymer compounds, or (c) the fluorine-containing polymer compound in the second embodiment, with a modifying material, and the proportion of the modifying material contained in the third binder is from 2 to 50% by weight based on 100% by weight of the third binder.

By controlling the proportion of the modifying material added to the third binder in the range described above, it is made possible to obtain the third binder which is excellent in adhesion and electrical conductivity. When the proportion of the modifying material in the binder is less than 2% by weight, the strength of bonding with the current collector becomes weak and, when the proportion is higher than 50% by weight, it becomes difficult to dissolve in the solvent. The proportion of the modifying material in the binder is preferably from 10 to 30% by weight.

Modification with the modifying material is preferably carried out by irradiating the polymer compound (a), (b), or (c) with radiation and mixing the modifying material with the irradiated polymer compound, thereby causing graft polymerization. Modification with the modifying material may also be carried out by mixing the modifying material with the polymer compound (a), (b), or (c) and irradiating the mixture with radiation, thereby causing graft polymerization.

Irradiation of the polymer compound (a), (b) or (c) with radiation is preferably carried out by using γ-rays so that an absorption dose of the polymer compound (a), (b) or (c) is from 1 to 120 kGy.

The absorption dose less than 1 kGy or higher than 120 kGy leads to problems of decreased adhesive strength of the binder.

A fourth aspect of the present invention is a lithium ion polymer secondary battery according to the first or second aspect, wherein
the first and second conductive materials contain a metal or partially oxidized metal having a particle size of 0.1 to 20 μm, and a weight ratio of the third binder to the first conductive material contained in the first bonding layer, (third binder/first conductive material), and a weight ratio of the third binder to the conductive material contained in the second bonding layer, (third binder/second conductive material), are from 13/87 to 75/25.

Since the first and second conductive materials contained in the first and second bonding layers contain a metal or partially oxidized metal, good electrical conductivity can be obtained with smaller quantity added to the bonding layer than the carbon material used as the electrical conductive material in the prior art, since the metal has good electrical conductivity. Furthermore, by controlling the particle sizes of the first and second conductive materials, the weight ratio of the third binder to the first conductive material contained in the first bonding layer, (third binder/first conductive material), and the eight ratio of the third binder to the second conductive material contained in the second bonding layer, (third binder/second conductive material), in predetermined ranges, satisfactory adhesion, high electrical conductivity and cycle capacity maintaining characteristics are obtained.

The first and second conductive materials preferably contain mixtures or alloys of one or more kinds selected from the group consisting of aluminum, steel, iron, nickel, cobalt, silver, gold, platinum, palladium, and partially oxidized material of these metals.

It is more preferable that the first and second bonding layers contain acidic polymer dispersant, basic polymer dispersant or neutral polymer dispersant.

A fifth aspect of the present invention is an electrode for a secondary battery, comprising a current collector and an active material layer formed on one or both surfaces of the current collector via a bonding layer containing a polymer binder, wherein a portion of the polymer binder exists in the bonding layer in the form of particles and a volume-mean particle size of the particulate polymer binder is from 1 to 100 μm.

The particulate polymer binder that exists in the bonding layer exists together with the conductive material, that exists in the form of particles, in the interface between the current collector and the bonding layer and in the interface between the active material layer and the bonding layer, thereby improving adhesion with the layers. The conductive material exists in the portion of interface between the current collector and the bonding layer where the particulate polymer binder does not exist and in the portion of the interface between the active material layer and the bonding layer, so that exchange of electrons is carried out smoothly in the interface because of the presence of the conductive material, and the electrical resistance can be maintained at a low level. Moreover, since the particulate polymer binder exists in the bonding layer, coagulating force in the bonding layer increases and the cycle capacity maintaining characteristics of the battery is improved.

The main component of the polymer binder is preferably a fluororesin.

By using the fluororesin as the main component of the polymer binder, an electrode for a secondary battery having high durability to the electrolytic solution can be obtained.

The polymer binder is preferably a compound obtained by graft polymerization of polyvinylidene fluoride and acrylic acid or methacrylic acid as a monomer.

By using acrylic acid or methacrylic acid as the modifying material, the electrode for a secondary battery containing the bonding layer having good adhesion with the current collector can be obtained.

The surface density of the particulate polymer binder in a cross section of the bonding layer parallel to the surface of the bonding layer is preferably from 1 to $100/cm^2$.

By controlling the surface density of the particulate polymer binder in a range from 1 to $100/cm^2$, the particulate polymer binder is distributed with a proper density in the interface between the current collector and the bonding layer and the interface between the active material layer and the bonding layer, and both adhesion and electrical conductivity in the interface can be maintained.

When the surface density is higher than $100/cm^2$, electrical conductivity in the interface described above decreases. When the surface density is lower than $1/cm^2$, adhesion in the interface described above is reduced. The surface density is more preferably from 10 to $80/cm^2$.

A sixth aspect of the present invention is a secondary battery comprising the electrode for a secondary battery of the fifth aspect.

The secondary battery is excellent in cycle capacity maintaining characteristics.

DESCRIPTION OF THE PREFERRED EMBODIMENTS

Figure 1:
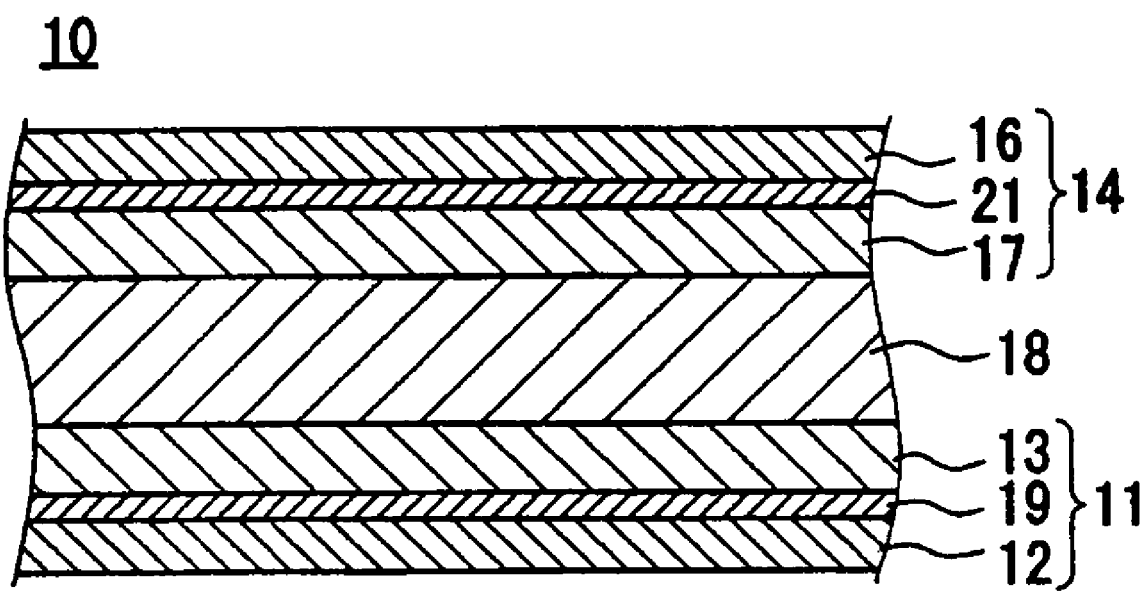
FIG. 1 is a partial partial schematic cross-sectional view showing an electrode body of a lithium ion polymer secondary battery of the present invention.

The lithium ion polymer secondary battery in accordance with the first embodiment of the present invention is characterized in that first and second bonding layers respectively contain both of a third binder and a conductive material, and the third binder is a polymer compound obtained by modifying a first or second binder with a modifying material.

The term "modification" as used herein means change of properties and also means to impart properties of a modifying material and new properties, which do not exist in a polymer compound and a modifying material, by modifying the polymer compound using the modifying material, in addition to intrinsic properties of the polymer compound before modification.

Since the modified polymer compound includes the first or second binder in the active material layer as a main group, it exhibits high adhesion with the active material layer. Also adhesion with the current collector is remarkably improved by modifying with the modifying material having high adhesion with the current collector as compared with the case of using the same binder as that in the active material layer. Therefore, peeling of the material layer from the current collector is suppressed and cycle characteristics are improved.

The modified polymer compound becomes chemically stable by modification, compared with the binder used in the active material layer, and thus peeling of the active material layer from the current collector is suppressed without being dissolved in the electrolytic solution. For the same reason, since the conductive material dispersed in the bonding layer is maintained without falling in, good electrical conductivity is maintained and the resulting battery is excellent in long-term storage stability and cycle characteristics. Since the current collector is coated with a chemically stable layer, even when hydrofluoric acid is generated in the battery, the bonding layer serves as a protective layer, and thus corrosion of the current collector can be prevented.

As compared with the binder used in the active material layer, the modified polymer compound becomes thermally stable by modification, and thus the battery is not dissolved in a solvent in the battery even at high temperature and deterioration of the battery can be suppressed. The modified polymer compound becomes electrochemically stable by modification as compared with the binder used in the active material layer and the positive electrode does not deteriorate under high potential upon full charging, and thus stable adhesion force and electrical conductivity are maintained. Since it is difficult for the electrolytic solution to penetrate into the modified polymer compound, the electrolytic solution does not significantly adhere to the current collector and dissociation of the positive electrode current collector upon full charging can be suppressed.

The procedure for production of the lithium ion polymer secondary battery of the present invention will now be described.

First, as the second embodiment of the present invention, the polymer compound, which forms a binder, contained in a positive electrode active material layer or a negative electrode active material layer, is modified with a modifying material and the resulting modified polymer compound is used as a third binder of first and second bonding layers.

It is required that the first and second bonding layers be chemically, electrochemically and thermally stable and, therefore, the polymer compound, which is contained in the first or second binder used in the active material and is also used as a raw material of the modified polymer compound, is preferably a polymer compound containing fluorine in the molecule. Examples of the fluorine-containing polymer compound include polytetrafluoroethylene, polychlorotrifluoroethylene, PVdF, vinylidene fluoride-hexafluoropropylene copolymer, and polyvinyl fluoride.

Examples of the technique of modifying the fluorine-containing polymer compound include graft polymerization and crosslinking. Examples of the modifying material used in the graft polymerization include compounds such as ethylene, styrene, butadiene, vinyl chloride, vinyl acetate, acrylic acid, methyl acrylate, methyl vinyl ketone, acrylamide, acrylonitrile, vinylidene chloride, methacrylic acid, and methyl methacrylate. When using acrylic acid, methyl acrylate, methacrylic acid and methyl methacrylate, particularly good adhesion with the current collector can be obtained.

Examples of the modifying material used in the crosslinking include compounds having two or more unsaturated bonds, for example, butadiene and isoprene. The crosslinking may be conducted by vulcanization.

As an example of this embodiment, graft polymerization will be described. Examples of the method of graft polymerization include a catalytic method, chain transfer method, radiation method, photopolymerization method, and mechanical cutting method. In the radiation method, a polymer compound and a compound, which serves as a grafted material, can be polymerized by irradiating with radiation continuously or intermittently and the polymer compound as the main component is preferably pre-irradiated before contacting the grafted material with the polymer compound. Specifically, a modified polymer compound comprising the polymer compound as a main chain and a modifying material as a side chain can be obtained by irradiating the polymer compound with radiation and mixing the irradiated polymer compound with the modifying material, which serves as the grafted material. Examples of the radiation used in the graft polymerization include electron beam, X-rays, and γ-rays. The polymer compound is irradiated with γ-rays at an adsorption dose of 1 to 120 kGy. By irradiating the polymer compound, as the main component, with radiation, a radical formed at one end and the grafted material is easily polymerized. In the following chemical schemes (1) and (2), graft polymerization of PVdF and acrylic acid by a radiation method is shown.

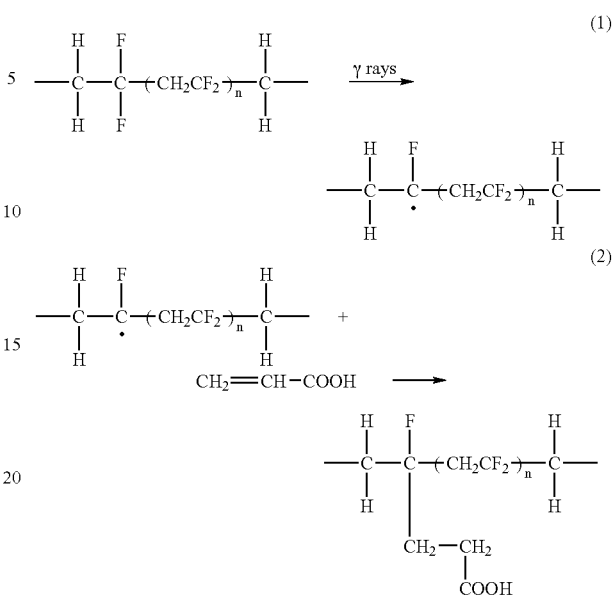

As shown in the chemical scheme (1), a radical is formed in the molecule of PVdF by irradiating PVdF with γ-rays as radiation. As shown in the chemical scheme (2), PVdF having a radical in the molecule is contacted with acrylic acid, whereby, a double bond portion of acrylic acid is graft-polymerized by the radical of PVdF.

As another example, graft polymerization of PVdF and methacrylic acid is shown in the chemical schemes (3) and (4).

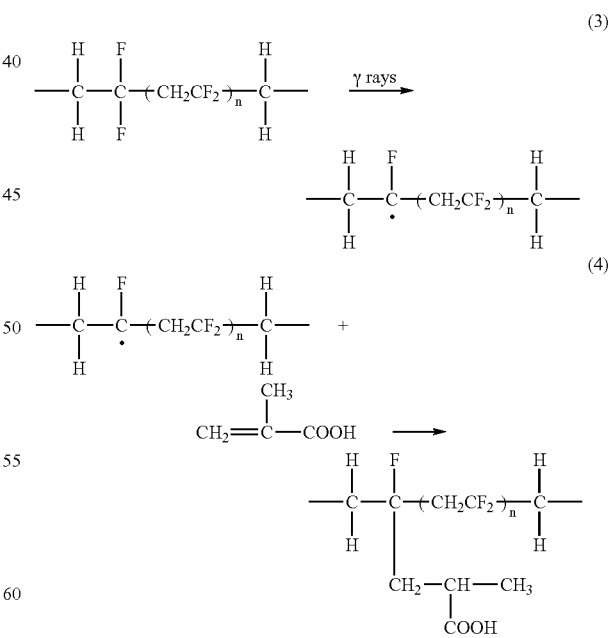

As shown in the chemical scheme (3), a radical is formed in the molecule of PVdF by irradiating PVdF with γ-rays as radiation and PVdF having a radical in the molecule is contacted with methacrylic acid in the chemical scheme (4), whereby, a double bond portion of methacrylic acid is graft-polymerized by the radical of PVdF.

In the graft polymerization, a grafted product varies depending on the time of contacting an activated polymer main chain with a monomer to be grafted, the degree of pre-activation of the polymer main chain by radiation, the monomer's ability of penetrating through the polymer main chain, the kind of polymer to be grafted, and the temperature upon contact with the monomer. In the case in which the monomer to be grafted is an acid, the proceeding degree of the graft polymerization reaction can be observed by sampling a graft reaction solution containing a monomer at any time and measuring the concentration of the residual monomer through titration with an alkali. The graft ratio in the resulting composition is preferably from 10 to 30% based on a final weight.

Using the graft-polymerized modified polymer compound thus obtained as a third binder of the bonding layer, the third binder is dissolved in a solvent to prepare a polymer solution, and then a conductive material is dispersed in the polymer solution to prepare slurries for first and second bonding layers. As the conductive material, a carbon material having a particle size of 0.5 to 30 μm and a graphitization degree of 50% or more is used. A slurry for a bonding layer is prepared by mixing a third binder with a conductive material in a weight ratio (third binder/conductive material) of 13/87 to 50/50. As the solvent, dimethylacetamide (hereinafter referred to as DMA), acetone, dimethylformamide and N-methyl pyrrolidone are used.

After a sheet-like positive electrode and a negative electrode current collector are prepared, the resulting slurries for first and second bonding layers are respectively applied on positive electrode and negative electrode current collectors by a doctor blade method and are then dried to form positive electrode and negative electrode current collectors with first and second bonding layers each having a dry thickness of 0.5 to 30 μm. The dry thickness of the bonding layer of positive and negative electrodes is preferably from 1 to 15 μm. The sheet-like positive electrode current collector include Al foil and the negative electrode current collector include Cu foil. The term "doctor blade method" as used herein is a method of controlling the thickness of a slip to be carried on a carrier such as carrier film or endless belt by adjusting a distance between a knife edge referred to as a doctor blade and a carrier, thereby to precisely control the thickness of a sheet.

The components required to form the positive electrode active material layer, the negative electrode active material layer and the electrolyte layer are mixed to prepare a coating slurry for a positive electrode active material layer, a coating slurry for a negative electrode active material layer and a coating slurry for an electrolyte layer.

The resulting coating slurry for a positive electrode active material layer is applied on the surface of a positive electrode current collector having a first bonding layer by a doctor blade method, is dried, and is then rolled to form a positive electrode. Similarly, the coating slurry for a negative electrode active material layer is applied on the surface of the surface of a negative electrode current collector having a second bonding layer by a doctor blade method, is dried, and is then rolled to form a negative electrode. The positive or negative electrode active material layer is formed in a dry thickness of 2 to 250 μm. The resulting coating slurry for an electrolyte layer is applied on a release paper by a doctor blade method to form an electrolyte layer having a dry thickness of 1 to 150 μm. The resulting coating slurry for an electrolyte layer may be applied on the surface of the positive electrode and the surface of the negative electrode to form an electrolyte layer. The resulting positive electrode, electrolyte layer, and negative electrode are laminated with each other, in this order, and the resulting laminate is subjected to thermal compression bonding to form a sheet-like electrode body, as shown in FIG. 1.

Finally, a positive electrode lead and a negative electrode lead, each made of Ni, are respectively connected to a positive electrode current collector and a negative electrode current collector, and then the resulting electrode bodies were housed in a laminate packaging material formed into a bag having an opening portion and the opening portion was sealed by thermal compression bonding under reduced pressure to obtain a sheet-like lithium ion polymer secondary battery.

The third embodiment of the present invention will now be described with reference to the accompanying drawings.

Figure 6:
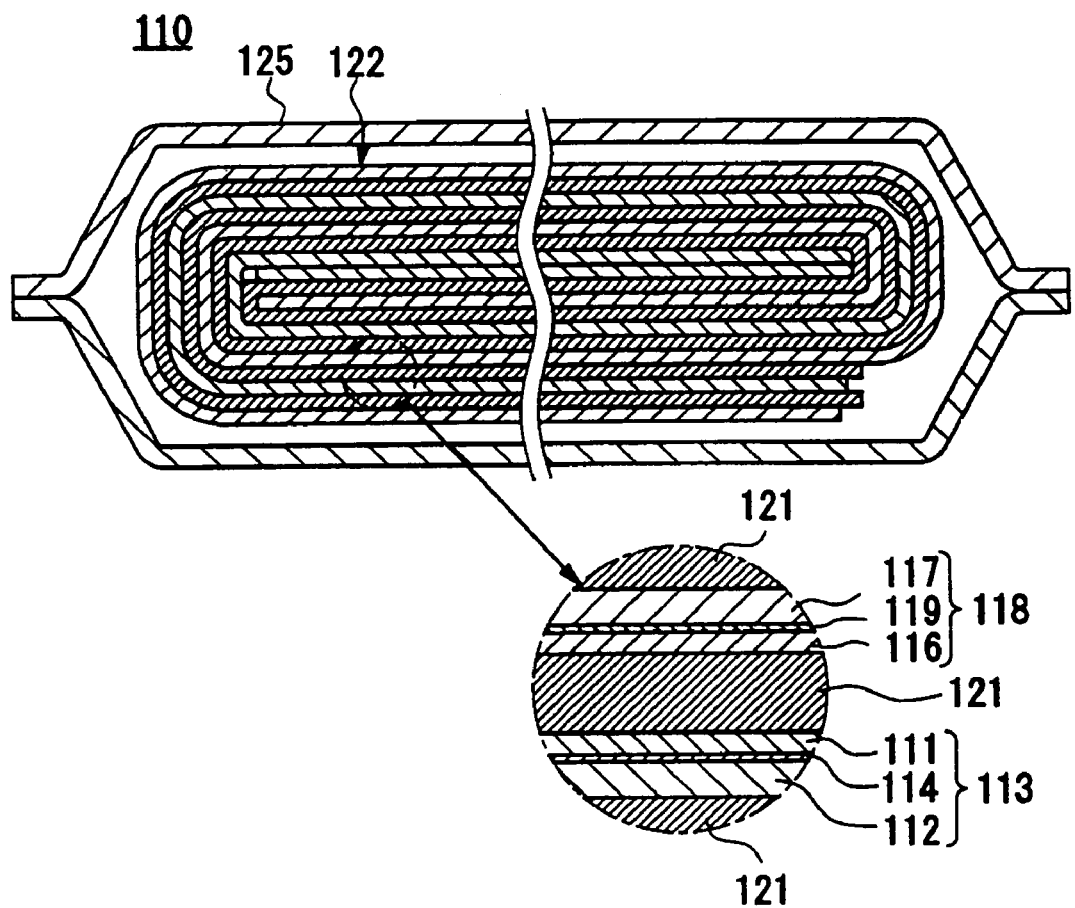
FIG. 6 is a cross-sectional view taken along line A-A in FIG. 7 showing a lithium ion polymer secondary battery in accordance with the third embodiment of the present invention.

As shown in FIG. 6, a lithium ion polymer secondary battery 110 comprises a positive electrode 113 formed by providing a positive electrode active material layer containing a binder for a positive electrode and a positive electrode active material on the surface of a positive electrode current collector layer 112; a negative electrode 118 formed by providing a negative electrode active material layer 116 containing a binder for a negative electrode and a negative electrode active material on the surface of a negative electrode current collector layer 117; and a polymer electrolyte layer 121 interposed between the surface of a positive electrode active material layer 111 of a positive electrode 113 and the surface of the negative electrode active material layer 116 of a negative electrode 118.

The positive electrode current collector layer 112 is made of an Al foil and the positive electrode active material layer 111 contains a positive electrode active material and a binder for a positive electrode. As the positive electrode active material, powders of $LiCoO_2$, $LiNiO_2$ and $LiMnO_4$ are used. The negative electrode current collector layer 117 is made of a Cu foil and the negative electrode active material layer 116 contains a negative electrode active material and a binder for a negative electrode. As the negative electrode active material, powders of a carbon material such as graphite are used.

Since it is required that the binder for a positive electrode and the binder for a negative electrode be chemically, electrochemically and thermally stable, a main component of the binder for a positive electrode and the binder for a negative electrode is preferably a polymer compound containing fluorine in the molecule. Examples of the fluorine-containing polymer compound include polytetrafluoroethylene, polychlorotrifluoroethylene, polyvinylidene fluoride, vinylidene fluoride-hexafluoropropylene copolymer, and polyvinyl fluoride.

As the polymer electrolyte layer 121, there can be used polymer sheets (for example, sheets made of fluororesins such as polyvinylidene fluoride and polyvinylidene fluoride-hexafluoropropylene copolymer, and polymers such as polyethylene oxide) which contain an electrolytic solution prepared by dissolving a lithium salt (for example, $LiPF_6$ or $LiBF_4$) in an organic solvent (for example, ethylene carbonate, propylene carbonate, dimethyl carbonate, diethyl carbonate, ethylmethyl carbonate, or γ-butyrolactone).

Between the positive electrode current collector layer 112 and the positive electrode active material layer 111, a first bonding layer 114 countering a first binder and a first conductive material is interposed. Between the negative electrode current collector layer 117 and the negative electrode active material layer 116, a second bonding layer 119 containing a second binder and a second conductive material is interposed. The first bonding layer 114 is formed by dispersing the first conductive material in the first binder. Similarly, the second bonding layer 119 is formed by dispersing the second conductive material in the second binder. Since the first bonding layer 114 or the second bonding layer 119 are chemically, electrochemically and thermally stable, and adhesion with the current collector layer and the active material layer is required, the binder for a positive electrode and the binder for a negative electrode, which are respectively contained in the positive electrode active material layer and the negative electrode active material layer, are used as main components of the first and second binders. As the first and second conductive materials, metal or partially oxidized metal each having a particle size of 0.1 to 20 μm is used. The particle size of these first and second conductive materials is from 0.1 to 20 μm, and preferably from 0.3 to 15 μm. When the particle size is less than 0.1 μm, particles agglomerate, and it becomes impossible to sufficiently disperse the conductive material on the current collector, resulting in low electronical conductivity and poor output characteristics. Since a proportion of the binder decreases at the agglomerated portion, adhesion force decreases, and also, cycle characteristics deteriorate. On the other hand, when the size exceeds 20 μm, the thickness of the bonding layer increases and thus volume energy density decreases. Since it becomes difficult to contact the materials, electronic conductivity is reduced, and also, output characteristics deteriorate. Examples of the metal include aluminum, copper, iron, nickel, cobalt, silver, gold, platinum, and palladium, and examples of the partially oxidized metal include oxides obtained by oxidizing a portion of the above-mentioned metals. As the first and second conductive materials, mixtures or alloys of one, or two, or more kinds selected from the group consisting of the above-mentioned metals and partially oxidized metals. By using metal or partially oxidized metal as the first and second conductive materials, good electrical conductivity can be obtained by adding a small amount of the conductive material, and thus the volume of the conductive material can be remarkably reduced.

The third embodiment of the present invention is characterized in that the first binder and the first conductive material contained in the first bonding layer 114, and the second binder and the second conductive material contained in the second bonding layer 119 are respectively mixed in a weight ratio of 13/87 to 75/25. By controlling the weight ratio of the first binder to the first conductive material contained in the first bonding layer 114 and the weight ratio of the second binder to the second conductive material contained in the second bonding layer 119 in the above-mentioned ranges, it is made possible to obtain a lithium ion polymer secondary battery which is excellent in adhesion and electrical conductivity between the positive electrode current collector and the positive electrode active material layer or between the negative electrode current collector and the negative electrode active material layer, and also has improved cycle capacity maintaining characteristics. The weight ratio of the first binder to the first conductive material and the weight ratio of the second binder to the second conductive material are from 13/87 to 75/25, and preferably from 14/86 to 33/67. When the weight ratio is less than 13/87, the proportion of the binder is small and sufficient adhesion force cannot be obtained. When the weight ratio exceeds 75/25, the amount of the conductive material contained in the bonding layer is small and sufficient electron transfer between the current collector and the active material layer cannot be conducted, and thus internal impedance increases.

A positive electrode 113 is formed in the following manner. A positive electrode current collector made of a sheet-like Al foil is prepared and the slurry for a first bonding layer is applied on the positive electrode current collector 112 and is then dried to form a positive electrode current collector with a first bonding layer having a dry thickness of 0.5 to 30 μm. The dry thickness of the first bonding layer is preferably from 1 to 15 μm. The components required to form a positive electrode active material layer are mixed to prepare a coating slurry for a positive electrode active material layer. The resulting coating slurry for a positive electrode active material layer is applied on the surface of the positive electrode current collector having a first bonding layer, is dried, and is then rolled to form a positive electrode 113. The positive electrode active material layer is formed so that the dry thickness is from 20 to 250 μm.

A negative electrode 118 is formed in the following manner. A negative electrode current collector made of a sheet-like Cu foil is prepared and the slurry for a second bonding layer is applied on the negative electrode current collector and is then dried to form a negative electrode current collector with a second bonding layer having a dry thickness of 0.5 to 30 μm. The dry thickness of the second bonding layer of the negative electrode is preferably from 1 to 15 μm. The components required to form a negative electrode active material layer are mixed to prepare a coating slurry for a negative electrode active material layer. In the same manner as in the case of forming the positive electrode, the resulting coating slurry for a negative electrode active material layer is applied on the surface of the negative electrode current collector having a second bonding layer, is dried, and is then rolled to form a negative electrode. The negative electrode active material layer is formed so that the dry thickness is from 20 to 250 μm.

A polymer electrolyte layer 121 is formed in the following manner. The components required to form the polymer electrolyte layer are mixed to prepare a coating slurry for a polymer electrolyte layer. The resulting coating slurry for a polymer electrolyte layer is applied on a release paper so that the dry thickness of the polymer electrolyte layer becomes 10 to 150 μm, and it is then dried to form a polymer electrolyte layer.

Figure 7:
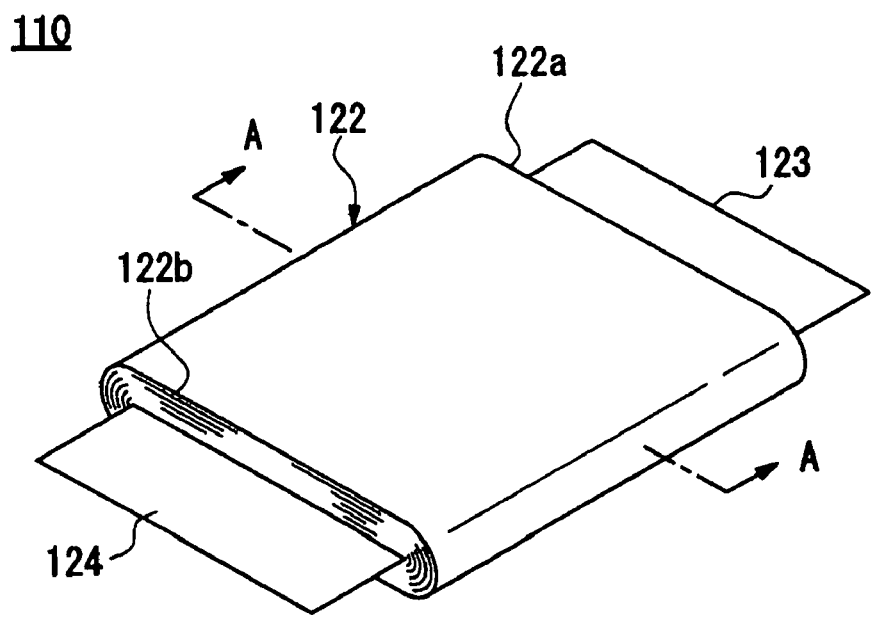
FIG. 7 is a perspective view showing a lithium ion polymer secondary battery in accordance with the third embodiment of the present invention.

A laminate is obtained by folding the polymer electrolyte layer 121 from a center, laminating to cover both surfaces of the edge portion of the negative electrode 118, and laminating the positive electrode 113 on the partial laminate. Then, a rolled body 122 is made by winding the resulting laminate in the form of a flattened roll (FIG. 6 and FIG. 7). As shown in FIG. 7, a single sheet-like positive electrode terminal 123 made of Ni, one end of which is connected electrically to the positive electrode current collector layer 112 of the rolled body 122, protrudes from one edge 122a of the rolled body 122, while a single sheet-like positive electrode terminal 124 made of Ni, one end of which is connected electrically to the negative electrode current collector layer 117 of the rolled body 122, protrudes from the other edge 122b of the rolled body 122. Furthermore, the rolled body 122 is enclosed in a package 125 (FIG. 6 and FIG. 7) so as to protrude from the other end of the positive electrode terminal 123 and the other end of the negative electrode terminal 124. The rolled body 122 is housed in a laminate packaging material 125 formed into a bag having an opening portion so as to protrude from the other end of the positive electrode terminal 123 and from the other end of the negative electrode terminal 124, and then the opening portion was sealed by thermal compression bonding under reduced pressure to obtain a sheet-like lithium ion polymer secondary battery.

Figure 8:
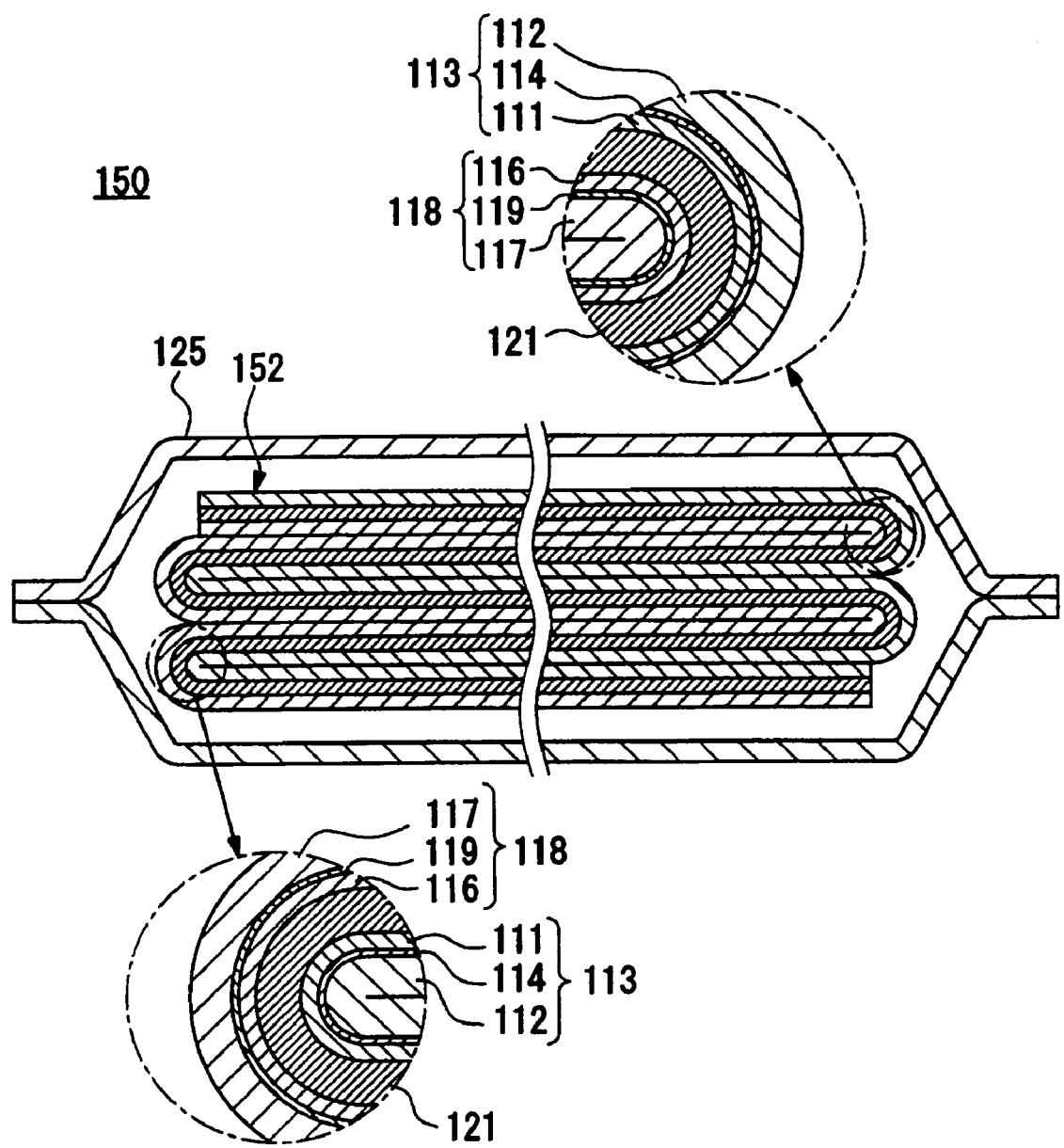
FIG. 8 is a cross-sectional view taken along line B-B in FIG. 9 showing a lithium ion polymer secondary battery in accordance with the fourth embodiment of the present invention.

The fourth embodiment of the present invention will now be described. In FIG. 8, the same symbols as in FIG. 6 denote the same parts.

In this embodiment, a positive electrode 113, a negative electrode 118, and a polymer electrolyte layer 121, which are formed in almost the same size, are laminated to make a laminate which is housed in a after pleatingdly folding the laminate. The phrase "pleatingly folding the laminate" refers to folding the laminate in a zigzaging manner. This embodiment has the same constitution as that of the first embodiment, except in the above respect.

The method of producing a secondary battery using the positive electrode 113 and the negative electrode 118 will now be described.

Figure 9:
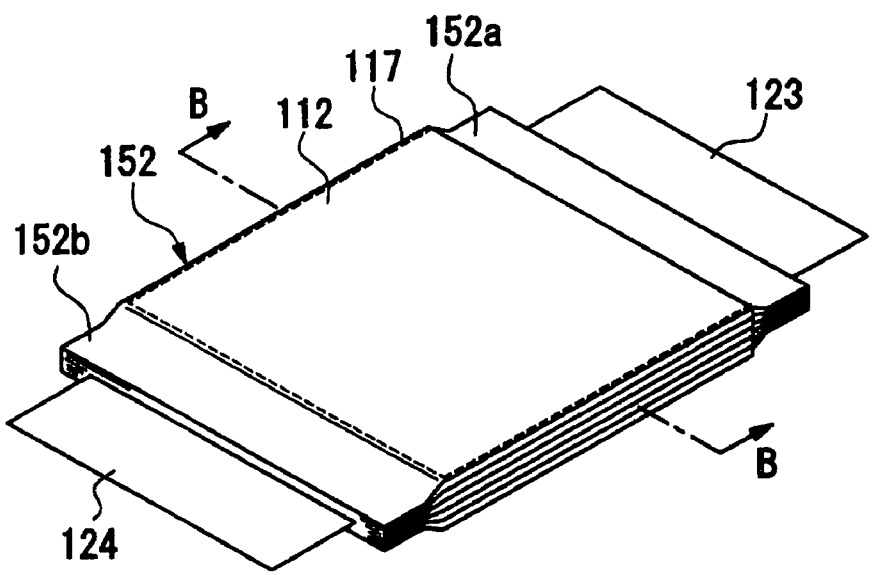
FIG. 9 is a perspective view showing a lithium ion polymer secondary battery in accordance with the fourth embodiment of the present invention.

First, a negative electrode 118, a polymer electrolyte layer 121 and a positive electrode 113 are laminated to make a laminate. Then, the laminate is pleatingly folded to make a flat pleatedly folded material 152 (FIG. 8 and FIG. 9). As shown in FIG. 9, a single sheet-like positive electrode terminal 123, one end of which is connected electrically to the positive electrode current collector layer 112 of the pleatedly folded material 152, protrudes from one edge 152a of the pleatedly folded material 152, while a single sheet-like positive electrode terminal 124, one end of which is connected electrically to the negative electrode current collector layer 117 of the pleatedly folded material 152, protrudes from the other edge of the pleatedly folded material 152. Furthermore, the pleatedly folded material 152 is enclosed in a package 125 (FIG. 8 and FIG. 9) so as to protrude from the other end of the positive electrode terminal 123 and the other end of the negative electrode terminal 124.

In the lithium ion polymer secondary battery 150 with such a constitution, the number man hours required to assemble the battery can be reduced as compared with the battery of the first embodiment.

The fifth embodiment of the present invention will now be described.

As shown in FIG. 1, a lithium ion polymer secondary battery comprises an electrode body 10 formed by laminating a positive electrode 11 and a negative electrode 14. The positive electrode 11 is made by providing a positive electrode active material layer 13 on the surface of a sheet-like positive electrode current collector 12, while the negative electrode 14 is made by providing a negative electrode active material layer 17 on the surface of a sheet-like negative electrode current collector 16. In the state where an electrolyte layer 18 is interposed between the positive electrode active material layer 13 and the negative electrode active material layer 17, the positive electrode 11 and the negative electrode 14 are laminated to form an electrode body 10. The positive electrode active material layer 13 contains a first binder, in addition to an active material such as $LiCoO_2$, while the negative electrode active material layer 17 contains a first binder, in addition to an active material such as graphite.

A first bonding layer 19 is provided between the positive electrode current collector 12 and the positive electrode active material layer 13, while a second bonding layer 21 is provided between the negative electrode current collector 16 and the negative electrode active material layer 17. The first and second bonding layers 19 and 21 contain both a polymer binder and a conductive material. The polymer binder in this embodiment is a polymer compound obtained by modifying the first or second binder with a modifying material. The term "modification" as used herein has the same meaning as in the first embodiment. The electrode for secondary battery of this embodiment is characterized in that a portion of the polymer binder exists in the bonding layers 19 and 21 in the form of particles and the volume-mean particle size of the particulate polymer binder is from 1 to 100 μm.

In the electrodes for battery 11 and 14 with such a constitution, the particulate polymer binder that exists in the bonding layers 19 and 21 exists together with the conductive material, that exists in the form of particles, in the interface between the current collectors 12 and 16 and the bonding layers 19 and 21 and in the interface between the active material layers 13 and 17 and the bonding layers 19 and 21, thereby improving adhesion with the layers. The conductive material exists in the portion of interface between the current collectors 12 and 16 and the bonding layers 19 and 21 where the particulate polymer binder does not exist and in the portion of the interface between the active material layers 13 and 17 and the bonding layers 19 and 21, so that exchange of electrons is carried out smoothly in the interface because of the presence of the conductive material, and the electrical resistance can be maintained at a low level.

Also a portion of the polymer binder exists in the bonding layers 19 and 21 in the form of particles, thereby improving the mechanical strength of the bonding layers 19 and 21 improving the strength of the active material layers 13 and 17 which are laminated in contact with the bonding layers 19 and 21. Furthermore, it is not required that the bonding layers 19 and 21 in the present invention be formed in a pattern of dots, stripes, or a grid. Therefore, it becomes easy to form the bonding layers 19 and 21 as compared with the case where the bonding layers must be formed in a predetermined pattern.

The procedure for the production of an electrode for a secondary battery of the fifth embodiment of the present invention will now be described.

First, the binder to be contained in the positive electrode active material layer or the negative electrode active material layer is modified with a modifying material, and then the resulting modified polymer compound is used as a polymer binder of the first and second bonding layers.

Since it is required that the first and second bonding layers 19 and 21 be chemically, electrochemically, and thermally stable, a polymer compound, which is a first or second binder used as an active material layer and is also a raw material of the modified polymer compound, is preferably a polymer compound containing fluorine in the molecule. Examples of the fluorine-containing polymer compound include polytetrafluoroethylene, polychlorotrifluoroethylene, PVdF, vinylidene fluoride-hexafluoropropylene copolymer, and polyvinyl fluoride.

Examples of the technique of modifying the fluorine-containing polymer compound include graft polymerization and crosslinking. Examples of the modifying material used in the graft polymerization include compounds such as ethylene, styrene, butadiene, vinyl chloride, vinyl acetate, acrylic acid, methyl acrylate, methyl vinyl ketone, acrylamide, acrylonitrile, vinylidene chloride, methacrylic acid, and methyl methacrylate. When using acrylic acid, methyl acrylate, methacrylic acid, and methyl methacrylate, particularly good adhesion with the current collector can be obtained.

Examples of the modifying material used in the crosslinking include compound having two or more unsaturated bonds, for example, butadiene and isoprene. The crosslinking may also be conducted by vulcanization.

Using the modified polymer compound thus obtained as a polymer binder of the bonding layer, the polymer binder is partially dissolved in a solvent to prepare a particulate polymer-containing polymer solution, and then a conductive material is dispersed in the resulting polymer solution to prepare slurries for first and second bonding layers. As the conductive material, a carbon material having a particle size of 0.5 to 30 µm and a graphitization degree of 50% or more is used. The polymer binder and the conductive material are mixed in a weight ratio (polymer binder/conductive material) of 13/87 to 50/50 to prepare a slurry for a bonding layer. As the solvent, dimethylacetamide (hereinafter referred to as DMA), acetone, dimethylformamide and N-methylpyrrolidone are used.

Sheet-like positive- and negative electrode current collectors 12 and 16 are prepared and the slurry for first and second bonding layers were applied on the positive- and negative electrode current collectors 12 and 16 by a doctor blade method to form positive- and negative electrode current collectors 12 and 16 with first and second bonding layers 19 and 21 each having a dry thickness of 0.5 to 30 µm. The dry thickness of the bonding layers 19 and 21 is preferably from 1 to 15 µm. Examples of the sheet-like positive electrode current collector 12 include Al foil, and examples of the negative electrode current collector 16 include Cu foil. The term "doctor blade method" as used herein is a method of controlling the thickness of a slip to be carried on a carrier such as a carrier film or an endless belt by adjusting a distance between a knife edge, referred to as a doctor blade, and a carrier, thereby precisely controling the thickness of a sheet.

Then, the components required to form a positive electrode active material layer 13 and a negative electrode active material layer 17 are mixed to prepare a coating slurry for a positive electrode active material layer and acoating slurry for a negative electrode active material layer. With respect to a positive electrode, the resulting coating slurry for a positive electrode active material layer is applied on the positive electrode current collector 12 having the first bonding layer 19 by a doctor blade method, is dried, and is then rolled. Also, with respect to a negative electrode 14, the resulting coating slurry for a negative electrode active material layer is applied on the negative electrode current collector 16 having the second bonding layer 21 by a doctor blade method, is dried, and is then rolled. The positive- and negative electrode active material layers 13 and 17 are formed so that the dry thickness becomes 20 to 250 µm. As described above, the positive electrode 11 for a secondary battery of the present invention and the negative electrode 14 for a secondary battery of the present invention are formed.

A secondary battery including the electrodes as the fifth embodiment of the present invention in accordance with the sixth embodiment of the present invention will now be described.

The secondary battery including the electrodes as the fifth embodiment of the present invention comprises the above-mentioned positive electrode 11 for secondary battery and the negative electrode 14 for secondary battery. Specific manufacturing procedures are as follows. First, the positive electrode 11 for a secondary battery and the negative electrode 14 for a secondary battery are prepared. Then, components required for an electrolyte layer 18 are mixed to prepare a slurry for formation of the electrolyte layer. The resulting coating slurry for an electrolyte layer is applied on a release paper by a doctor blade method so that the dry thickness of the electrolyte layer 18 becomes 10 to 150 µm, and is then dried to form an electrolyte layer. Also, the electrolyte layer 18 may be formed by applying the coating slurry for an electrolyte layer on the surface on a positive electrode 11 or the surface of a negative electrode 14 and then drying. The positive electrode 11, the electrolyte layer 18 and the negative electrode 14 are laminated with each other, in this order, and the resulting laminate is subjected to thermal compression bonding to form a sheet-like electrode body 10 shown in FIG. 1.

A lithium ion polymer secondary battery of the present invention can be produced by respectively connecting a positive electrode lead and a negative electrode lead, each made of Ni (not shown), to a positive electrode current collector 12 and a negative electrode current collector 16, housing the sheet-like electrode bodies 10 in a laminate packaging material formed into a bag having an opening portion, and sealing the opening portion by thermal compression bonding under reduced pressure.

Examples of the present invention will now be described, together with Comparative Examples.

EXAMPLE 1

First, 50 g of powdered PVdF was prepared as first and second binders and 260 g of an aqueous 15 wt % acrylic acid solution was prepared as a modifying material. The powdered PVdF was placed in a polyethylene pack, vacuum-packed, and then irradiated with γ-rays at an absorption dose of 50 kGy using cobalt-60 as the γ-ray source. The powdered PVdF irradiated with γ-rays was taken out from the polyethylene pack and transferred into a nitrogen atmosphere. PVdF was supplied into 260 g of the aqueous 15 wt % acrylic acid solution, maintained at 80° C. and then reacted with the aqueous acrylic acid solution, thereby to synthesize acrylic acid grafting polyvinylidene fluoride produced by the graft polymerization shown in the above chemical scheme (2) (hereinafter referred to as AA-g-PVdF).

A sample of the reaction solution was collected and a decrease in amount of the acrylic acid due to the graft polymerization reaction with PVdF was successively measured by titration. When the content of the grated acrylic acid group in AA-g-PVdF reached 17% by weight, the reaction was terminated and the resulting solid product was washed with pure water and was then dried to obtain a third binder.

EXAMPLE 2

In the same manner as in Example 1, except that the modifying material was replaced by 260 g of an aqueous 15 wt % acrylic acid solution, a third binder was obtained.

EXAMPLE 3

In the same manner as in Example 1, except that the modifying material was replaced by 260 g of an aqueous 15 wt % methyl acrylate solution, a third binder was obtained.

EXAMPLE 4

In the same manner as in Example 1, except that the modifying material was replaced by 260 g of an aqueous 15 wt % methyl methacrylate solution, a third binder was obtained.

COMPARATIVE EXAMPLE 1

A commercially available acrylate ester-methacrylate ester copolymer was prepared as a third binder.

COMPARATIVE EXAMPLE 2

A commercially available homopolymer of PVdF was prepared as a third binder.

COMPARATIVE EXAMPLE 3

A commercially available copolymer of PVdF-HFP was prepared as a third binder.

COMPARATIVE EXAMPLE 4

In the same manner as in Example 1, except that the modifying material was replaced by 2600 g of an aqueous solution containing 1% by weight of crotonic acid, a third binder was obtained.

Comparative Evaluation 1

Using the third binders obtained in Examples 1 to 4 and Comparative Examples 1 to 4, the following evaluation tests were conducted.

(1) Test for Solubility in Dimethylacetamide

Polymer solutions were prepared by weighing 4 g of each of the third binders obtained in Examples 1 to 4 and Comparative Examples 1 to 4, and adding 56 g of DMA to samples, followed by stirring with heating to 60° C. The resulting solutions were stored in a glass bottle and were allowed to stand for one day, and then the state of precipitation in the solutions was determined.

(2) Test for Adhesion with Copper Foil and Aluminum Foil

First, the same polymer solutions as those for the above-mentioned evaluation test (1) were prepared by using the third binders obtained in Examples 1 to 4 and Comparative Examples 1 to 4. Each of these solutions was uniformly applied on a Cu foil having a width of 30 mm, a length of 200 mm and a thickness of 14 μm, the surface of which was degreased, and then an Al foil having a width of 10 mm, a length of 100 mm and a thickness of 20 μm, the surface of which was degreased, was applied thereon to make a peel specimen for adhesion test. The resulting specimen was dried in atmospheric air at 80° C. for 5 days using a dryer. Then, the binder of the dried specimen to the Cu foil and the Al foil was evaluated by a machine for peeling testing. In the peeling test, the Cu foil side of the specimen was fixed to a testing stand and the Al foil bonded to the Cu foil was vertically pulled upward at a rate of 100 mm/min, and then a force required to peel off the Al foil from the Cu foil was measured.

(3) Test for Cycle Capacity Maintaining Characteristics of Battery When Used in the Bonding Layer of a Battery First, polymer solutions were prepared by weighing 2 g of each of the third binders obtained in Examples 1 to 4 and Comparative Examples 1 to 4, and adding 200 g of DMA to the samples, followed by stirring and heating to 60° C. To each of the solutions, 8 g of powdered graphite having a specific surface area of 150 m²/g and 1.2 g of a dispersant for dispersing the powdered graphite were added to prepare a slurry for a bonding layer. After preparing an Al foil having a thickness of 20 μm and a width of 250 μm as a positive electrode current collector, the resulting slurry for a bonding layer was applied on the Al foil by a doctor blade method and was then dried. The thickness of the bonding layer after drying was controlled within a range of 10±1 μm. After preparing a Cu foil having a thickness of 14 μm and a width of 250 μm as a negative electrode current collector, the resulting slurry for a bonding layer was applied on the Cu foil by a doctor blade method and was then dried. The thickness of the bonding layer after drying was controlled within a range of 10±1 μm. The respective components shown in Table 1 below were mixed in a ball mill for 2 hours to prepare a coating slurry for a positive electrode active material layer, a coating slurry for a negative electrode active material layer, and a coating slurry for an electrolyte layer.

TABLE 1

| | Coating slurry component | Parts by weight |
|---|---|---|
| Positive electrode active material layer | LiCoO$_2$ | 90 |
| | Powdered graphite | 6 |
| | PVdF | 4 |
| | N-methyl pyrrolidone | 45 |
| Negative electrode active material layer | Powdered graphite | 90 |
| | PVdF | 10 |
| | N-methyl pyrrolidone | 50 |
| Electrolyte layer | Vinylidene fluoride-hexafluoropropylene copolymer | 17 |
| | Propylene carbonate | 15 |
| | Ethylene carbonate | 30 |
| | Diethyl carbonate | 30 |
| | LiPF$_6$ | 8 |
| | Acetone | 80 |

The resulting coating slurry for a positive electrode active material layer was applied on the surface of the Al foil having the bonding layer by a doctor blade method so that the dry thickness of the positive electrode active material layer was 80 μm, was dried, and was then rolled to form a positive electrode. Similarly, the coating slurry for a negative electrode active material layer was applied on the surface of the Cu foil having the bonding layer by a doctor blade method so that the dry thickness of the positive electrode active material layer was 80 μm, was dried, and wasthen rolled to form a negative electrode. Furthermore, the coating slurry for an electrolyte layer was respectively applied on the positive electrode and the negative electrode by a doctor blade method so that each dry thickness was 50 μm, and then the positive and negative electrodes, each having an electrolyte layer, were laminated with each other by thermal compression bonding to yield sheet-like electrode bodies. In the resulting sheet-like electrode bodies, a positive electrode lead and a negative electrode lead, each being made of Ni, were respectively connected to a positive electrode current collector and a negative electrode current collector, and then the sheet-like electrode bodies were housed in a laminate packaging material formed into a bag having an opening portion, and the opening portion was sealed by thermal compression bonding under reduced pressure to obtain a sheet-like battery.

Then, a charge-discharge cycle, comprising a charge step of charging the resulting sheet-like battery under the conditions of a maximum charge voltage of 4 V and a charge current of 0.5 A for 2.5 hours, and a discharge step of discharging at a constant current of 0.5 A until the discharge voltage was reduced to a minimum discharge voltage of 2.75 V, was repeated, and then a charge-discharge capacity of each cycle was measured and the number of cycles required to reduce to 80% of an initial discharge capacity was measured.

(4) Test for Adhesion of Bonding Layer to Current Collector When Used in Bonding Layer of Battery First, the same sheet-like batteries as those for the above-mentioned evaluation test (3) were prepared by using the third binders obtained in Examples 1 to 4 and Comparative Examples 1 to 4. Under conditions of 70° C., 100 charge-discharge cycles of the resulting batteries were conducted under the same conditions as those in the evaluation test (3). After the completion of 100 charge-discharge cycles, the housing package of the sheet-like battery was removed and the positive electrode and the negative electrode of the battery were detached and separated. It was then determined whether or not the bonding layer would peeled off from the current collector when pulling the bonding layers of the separated positive and negative electrodes using forceps.

The evaluation results in the evaluation tests (1) to (4) are shown in Table 2. Symbols in the column of the evaluation test (1) in Table 2 have the following meaning.
⊚: uniform solution with no precipitate.

Symbols in the column of the evaluation test (4) shown in Table 2 have the following meanings.
⊚: excellent adhesion of bonding layer to current collector; not peeled off
○: bonding layer is partially peeled off from current collector
Δ: bonding layer is peeled off from current collector over a large area
×: bonding layer is completely peeled off from current collector sufficient to bond the active material with the current collector of the battery because all peel strengths from the Cu foil were 10 N/cm or more.

In the cycle capacity maintaining characteristics test as the evaluation test (3), 80% capacity cycle number of the batteries using the third binders of Examples 1 to 4 were higher than those of batteries using the third binders of Comparative Examples 1 to 4. The reason is believed to be as follows. That is, cycle capacity maintaining characteristics were improved because the third binders of Examples 1 to 4 are excellent in adhesion and have high durability to the electrolytic solution.

In the test for adhesion of the bonding layer to the current collector as the evaluation test (4), the bonding layers using the third binders of Examples 1 to 4 are excellent in adhesion with the current collector because they are not easily peeled off from the current collector as compared with the bonding layers using the third binders of Comparative Examples 1 to 4. The batteries of Comparative Example 1 using a copolymer containing no fluorine as the third binder are excellent in adhesion with the Cu foil and the Al foil, but are insufficient in resistance to the electrolytic solution. Therefore, after repeated charge-discharge cycles, the bonding layer was peeled off from the current collector of the battery.

As is apparent from the results of the above evaluation tests, a modified polymer compound obtained by grafting PVdF with a modifying material, particularly acrylic acid, methyl acrylate, methacrylic acid, or methyl methacrylate is, suitable for use as the third binder of the first and second bonding layers.

TABLE 2

| | Evaluation test (1) Solubility of third binder in DMA | Evaluation test (2) Peel strength [N/cm] of Cu and Al bonded | Evaluation test (3) 80% Capacity cycle number [times] of battery | Evaluation test (4) Adhesion of bonding layer to current collector after 100 cycles | |
|---|---|---|---|---|---|
| | | | | Positive electrode current collector | Negative electrode current collector |
| Example 1 | ⊚ | 16.46 | 635 | ⊚ | ⊚ |
| Example 2 | ⊚ | 10.09 | 480 | ⊚ | ○ |
| Example 3 | ⊚ | 15.58 | 565 | ⊚ | ⊚ |
| Example 4 | ⊚ | 13.15 | 523 | ⊚ | ⊚ |
| Comparative Example 1 | ⊚ | 6.89 | 194 | X | Δ |
| Comparative Example 2 | ⊚ | 0.98 | 183 | X | X |
| Comparative Example 3 | ⊚ | 0.98 | 157 | X | X |
| Comparative Example 4 | ⊚ | 1.96 | 92 | Δ | Δ |

As is apparent from Table 2, the solubility in DMA as in the evaluation test (1) is suitable for use as a coating slurry because the third binders obtained in Examples 1 to 4 and Comparative Examples 1 to 4 can be completely dissolved in DMA and no precipitate is produced even when the solution is allowed to stand for one day.

In the test for adhesion with the Cu foil and the Al foil as the evaluation test (2), the peel strength was 2 N/cm or less in the test using the third binders obtained in Comparative Examples 2 to 4 and, therefore, it was found that the bonding effect as the bonding layer material was insufficient. In contrast, the Al foil bonded to the Cu foil using the third binders obtained in Examples 1 to 4 exhibited a strength

EXAMPLES 5 TO 11 AND COMPARATIVE EXAMPLES 5 TO 6

First, 50 g of powdered PVdF was prepared as first and second binders and 260 g of an aqueous 15 wt % acrylic acid solution was prepared as a modifying material. The powdered PVdF was placed in a polyethylene pack, vacuum-packed, and then irradiated with γ-rays at an absorption dose of 50 kGy using cobalt-60 as the γ-ray source. The powdered PVdF irradiated with γ-rays was taken out from the polyethylene pack and transferred into a nitrogen atmosphere. PVdF was supplied into 260 g of the aqueous 15 wt % acrylic acid solution, maintained at 80° C., and then reacted with the aqueous acrylic acid solution, thereby synthesizing AA-g-PVdF.

A sample of the reaction solution was collected, and a decrease in the amount of the acrylic acid due to the graft polymerization reaction with PVdF was successively measured by titration. When the content of the grated acrylic acid group in AA-g-PVdF reached 2% by weight (Example 5), 7% by weight (Example 6), 10% by weight (Example 7), 13% by weight (Example 8), 17% by weight (Example 9), 25% by weight (Example 10), 40% by weight (Example 11), 1% by weight (Comparative Example 5), or 55% by weight (Comparative Example 6), the reaction was terminated, and the resulting solid product was washed with pure water and was then dried to obtain the third binders of Examples 5 to 11 and Comparative Examples 5 to 6.

Comparative Evaluation 2

Figure 2:
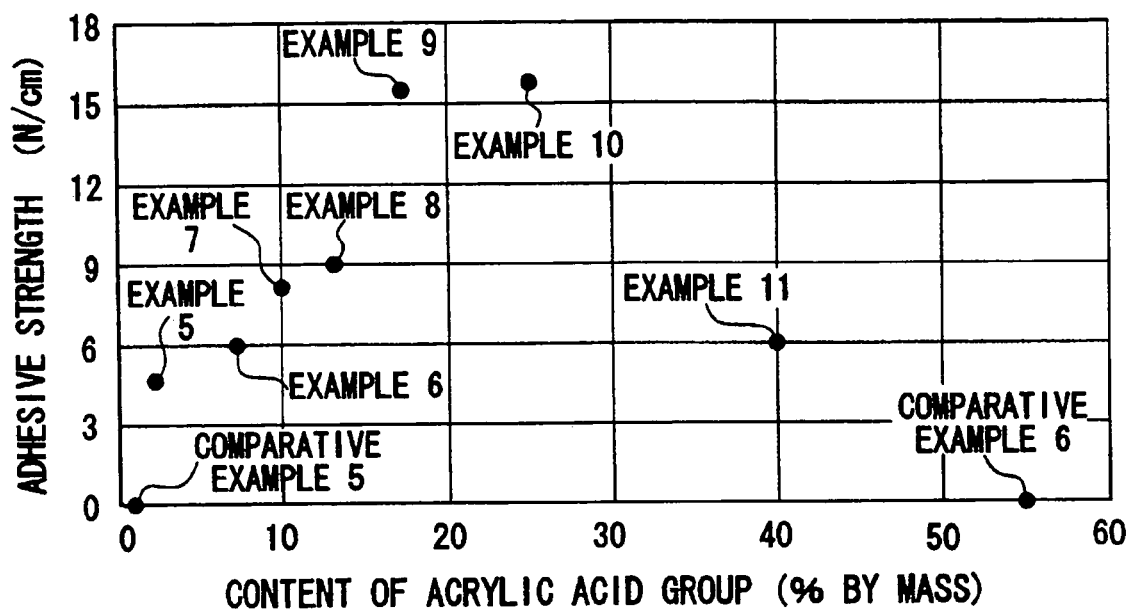
FIG. 2 is a graph showing the results of an evaluation test (2) of third binders obtained in Examples 5 to 11 and Comparative Examples 5 to 6.
Figure 3:
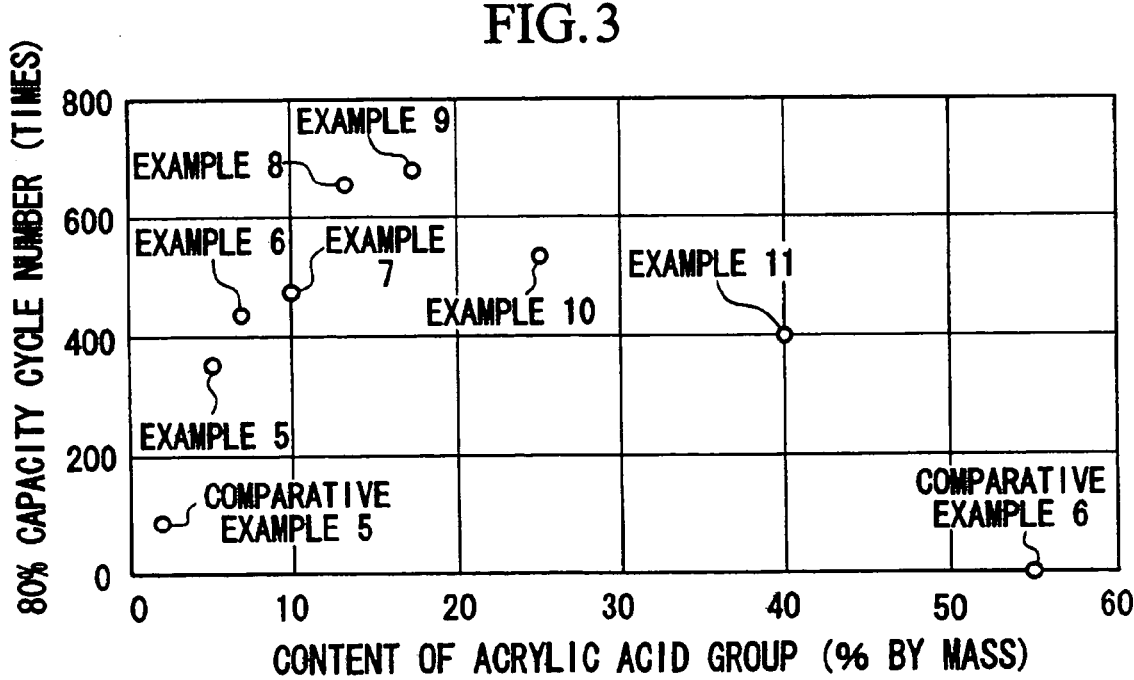
FIG. 3 is a graph showing the results of an evaluation test (4) of third binders obtained in Examples 5 to 11 and Comparative Examples 5 to 6.

Using the third binders obtained in Examples 5 to 11 and Comparative Examples 5 to 6, the same evaluation tests (1) to (4) as in comparative evaluation 1 were conducted and the influence of the content of an acrylic acid group in nine kinds of AA-g-PVdF on the adhesion and electrical characteristics of the battery was examined. The results of the evaluation tests (1) and (4) are shown in Table 3, the results of the evaluation test (2) are shown in FIG. 2 and the results of the evaluation test (3) are shown in FIG. 3. Symbols in the column of the evaluation test (1) shown in Table 3 have the following meanings.

◎: uniform solution with no precipitate
○: dissolved in DMA; a small amount of precipitate is produced
×: not dissolved in DMA Symbols in the column of the evaluation test (4) shown in Table 3 have the following meanings.

◎: bonding layer is not peeled off because of excellent adhesion with current collector
○: bonding layer is partially peeled off from current collector
×: bonding layer is completely peeled off from current collector

TABLE 3

|  | Evaluation test (1) Solubility of third binder in DMA | Evaluation test (4) Adhesion of bonding layer to current collector after 110 cycles | |
|---|---|---|---|
|  |  | Positive electrode current collector | Negative electrode current collector |
| Example 5 | ◎ | ○ | ○ |
| Example 6 | ◎ | ◎ | ◎ |
| Example 7 | ◎ | ◎ | ◎ |
| Example 8 | ◎ | ◎ | ◎ |
| Example 9 | ◎ | ◎ | ◎ |
| Example 10 | ◎ | ◎ | ◎ |
| Example 11 | ○ | ◎ | ○ |
| Comparative Example 5 | ◎ | X | X |
| Comparative Example 6 | X | X | X |

As is apparent from Table 3, the third binders of Examples 5 to 9 having a content of an acrylic acid group of 25% by weight or less were completely dissolved in DMA, and no precipitate was produced even when allowed to stand, regarding the solubility in DMA as the evaluation test (1). The third binder of Example 10 having a content of an acrylic acid group of 25% by weight was not easily dissolved in DMA and a small amount of a precipitate was produced when the solution was allowed to stand for one day. A small amount of the precipitate is dissolved again by stirring the solution for a long time using a homogenizer and is used to adhere to the copper foil and the aluminum foil without causing any problem. In contrast, the third binder of Example 6 having a content of an acrylic acid group of 55% by weight scarcely dissolved in DMA and is not suitable to adhere to the foil and the aluminum foil. The third binder of Comparative Example 5 having a content of an acrylic acid group of 1% by weight was dissolved in DMA without causing any problem.

In the test for adhesion with the Cu foil and the Al copper foil as the evaluation test (2), as shown in FIG. 2, the adhesive strength of the Cu foil and the Al foil bonded with AA-g-PVdF has a correlation with the content of an acrylic acid group in AA-g-PVdF. As is apparent from the results of Comparative Example 6, the effect of bonding is reduced when the content becomes 55% by weight or more. This is because the solubility of AA-g-PVdF in DMA was insufficient, as is apparent from the results of the evaluation test (1). Also in Comparative Example 5 wherein the content of the acrylic acid group is 1% by weight, the adhesive strength decreased. As is apparent from the results of Examples 5 to 11, the content of the acrylic acid group in AA-g-PVdF must be within a range from 2 to 50% by weight, and preferably from 10 to 30% by weight, in order to obtain sufficient adhesion.

In the test for cycle capacity maintaining characteristics as the evaluation test (3), as shown in FIG. 3, the test results are the same as those in the adhesive strength as the evaluation test (2).

In the test for adhesion of the bonding layer to the current collector as the evaluation test (4), as is apparent from Table 3, when the content of the acrylic acid group in AA-g-PVdF is from 2 to 50% by weight, and preferably from 10 to 30% by weight, adhesion characteristics of the bonding layer are suited for use as the binder of the battery similar to the evaluation test (2) and the evaluation test (3) as a result of analysis of the bonding layer of the battery after repeating charge-discharge cycles.

EXAMPLES 12 TO 16 AND COMPARATIVE EXAMPLES 7 TO 8

First, 50 g of powdered PVdF was prepared as first and second binders and 260 g of an aqueous 15 wt % acrylic acid solution was prepared as a modifying material. The powdered PVdF was put in a polyethylene pack, vacuum-packed, and then irradiated with γ-rays at an absorption dose of 90 kGy (Example 12), 70 kGy (Example 13), 50 kGy (Example 14), 20 kGy (Example 15), 10 kGy (Example 16), 130 kGy (Comparative Example 7) or 0.5 kGy (Comparative Example 8) using cobalt-60 as a γ-ray source. The powdered PVdF irradiated with γ-ray was taken out from the polyethylene pack and transferred into a nitrogen atmosphere. PVdF was supplied into 260 g of the aqueous 15 wt % acrylic acid solution, maintained at 80° C., and then reacted with the aqueous acrylic acid solution, thereby synthesizing AA-g-PVdF.

A sample of the reaction solution was collected and a decrease in amount of the acrylic acid due to the graft polymerization reaction with PVdF was successively measured by titration. When the content of the grated acrylic acid group in AA-g-PVdF reached 17% by weight, the reaction was terminated and the resulting solid product was washed with pure water and then dried to obtain third binders of Examples 12 to 16 and Comparative Examples 7 to 8.

Comparative Evaluation 3

Figure 4:
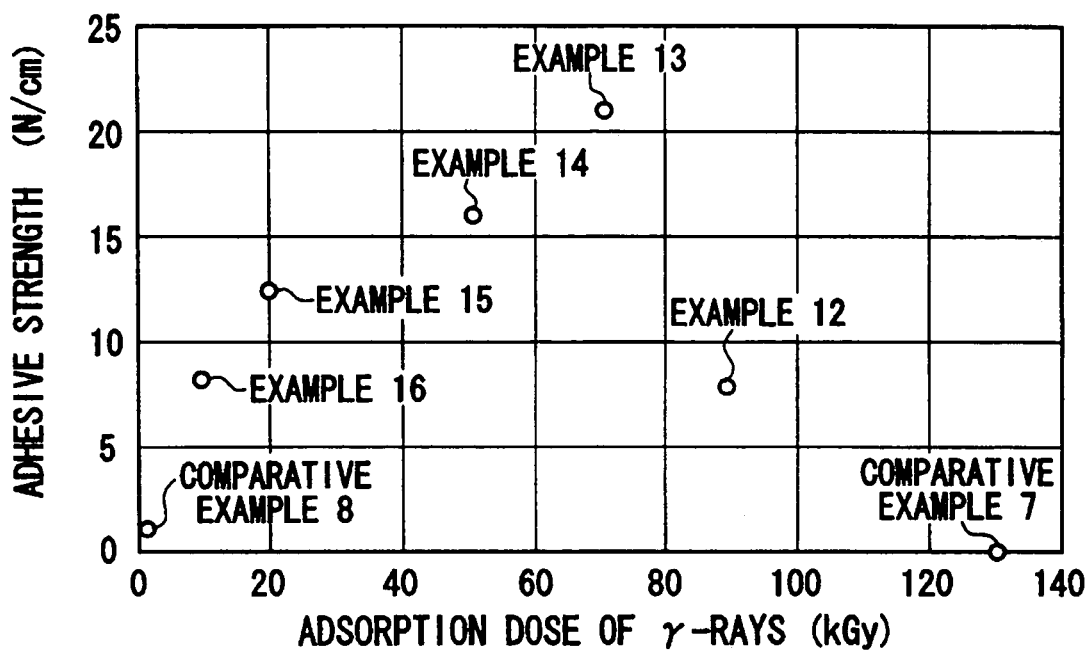
FIG. 4 is a graph showing the results of an evaluation test (2) of third binders obtained in Examples 12 to 16 and Comparative Examples 7 to 8.
Figure 5:
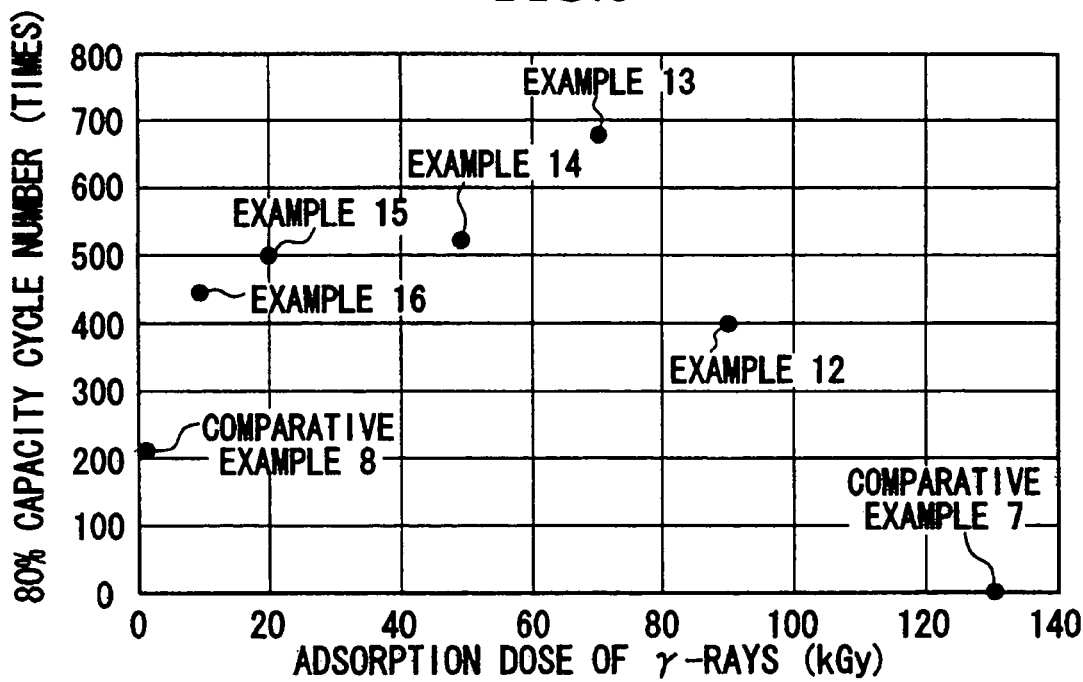
FIG. 5 is a graph showing the results of an evaluation test (4) of third binders obtained in Examples 12 to 16 and Comparative Examples 7 to 8.

Using the third binders obtained in Examples 12 to 16 and Comparative Examples 7 to 8, the same evaluation tests (1) to (4) as in comparative evaluation 1 were conducted. The results of the evaluation tests (1) and (4) are shown in Table 4, the results of the evaluation test (2) are shown in FIG. 4, and the results of the evaluation test (3) are shown in FIG. 5. Symbols in the columns of the evaluation tests (1) and (4) shown in Table 4 have the same meanings as those used in the comparative evaluation 2.

TABLE 4

| | Evaluation test (1) Solubility of third binder in DMA | Evaluation test (4) Adhesion of bonding layer to current collector after 100 cycles | |
|---|---|---|---|
| | | Positive electrode current collector | Negative electrode current collector |
| Example 12 | ○ | ◎ | ○ |
| Example 13 | ◎ | ◎ | ◎ |
| Example 14 | ◎ | ◎ | ◎ |
| Example 15 | ◎ | ◎ | ◎ |
| Example 16 | ◎ | ○ | ○ |
| Comparative Example 7 | X | X | X |
| Comparative Example 8 | ◎ | X | X |

As is apparent from Table 4, regarding the solubility in DMA as the evaluation test (1), in Examples 13 to 16, in which the absorption dose was less than 70 kGy, the synthesized AA-g-PVdF could be dissolved in DMA even at room temperature. In Example 12, in which the absorption dose was 90 kGy, the synthesized AA-g-PVdF was dissolved in DMA maintained at high temperature (85° C.). In contrast, in Comparative Example 7, in which the absorption dose was 130 kGy, it was nearly impossible to dissolve in DMA even when stirred.

In the test for adhesion with the Cu foil and the Al foil as the evaluation test (2), as shown in FIG. 4, the adhesive strength of the Cu foil and the Al foil bonded with AA-g-PVdF has a correlation with the content of an acrylic acid group in AA-g-PVdF. As is apparent from the results of Comparative Examples 7 and 8, when the absorption dose is less than 1 kGy or exceeds 120 kGy, the adhesive strength of AA-g-PVdF is reduced and the resulting binder is not suited for use as the binder. The reason is believed to be as follows. That is, when the dose is less than 1 kGy, fewer acrylic acid groups are grafted, and when the dose exceeds 120 kGy, AA-g-PVdF has insufficient solubility.

In the test for cycle capacity maintaining characteristics as the evaluation test (3), as shown in FIG. 5, the test results are the same as those in the adhesive strength as the evaluation test (2). As is apparent from these results, the absorption dose is preferably within a range from 1 kGy to 120 kGy in order to produce a battery capable of maintaining 80% capacity at 400 cycles or more.

In the test for adhesion of the bonding layer to the current collector as the evaluation test (4), as is apparent from Table 4, AA-g-PVdF synthesized by using PVdF having an absorption dose of 1 kGy to 120 kGy is suited for used as the binder for bonding layer of the battery as a result of analysis of the bonding layer of the battery after repeating charge-discharge cycles. To obtain stable adhesion characteristics, PVdF having a γ-ray absorption dose of 20 to 100 kGy is preferably used as a raw material.

EXAMPLE 17

First, as the third binder, 2 g of AA-g-PVdF obtained by graft polymerization of 17% by weight of acrylic acid and PVdF was prepared. 2 g of AA-g-PVdF was dissolved in 98 g of DMA as a solvent using a homogenizer to obtain a polymer solution. As a conductive material, 8 g of powdered graphite having a specific surface area of 150 $m^2/g$ was prepared and the powdered graphite was dispersed in 80 g of DMA to prepare a dispersion. The resulting dispersion was added to the above polymer solution to prepare a slurry for a bonding layer.

An Al foil having a thickness of 20 μm and a width of 250 mm was prepared as a positive electrode current collector and the slurry for a bonding layer was applied on the Al foil by a doctor blade method and was then dried to obtain an Al foil with a bonding layer having a dry thickness of 5 μm. A Cu foil having a thickness of 10 μm and a width of 250 mm was prepared as a negative electrode current collector and the slurry for a bonding layer was applied on the Cu foil by a doctor blade method and was then dried to obtain a Cu foil with a bonding layer having a dry thickness of 5 μm.

The above-mentioned respective components shown in Table 1 were mixed in a ball mill for 2 hours to prepare a coating slurry for a positive electrode active material layer, a coating slurry for a negative electrode active material layer and coating slurry for an electrolyte layer.

The resulting coating slurry for a positive electrode active material layer was applied on the surface of the Al foil having the bonding layer by a doctor blade method so that the dry thickness of the positive electrode active material layer was 80 μm, was dried, and was then rolled to form a positive electrode. Similarly, the coating slurry for a negative electrode active material layer was applied on the surface of the Cu foil having the bonding layer by a doctor blade method so that the dry thickness of the positive electrode active material layer was 80 μm, was dried, and was then rolled to form a negative electrode. The resulting coating slurry for an electrolyte layer was applied on a release paper having a thickness of 25 μm and a width of 250 mm by a doctor blade method so that the dry thickness of the electrolyte layer was 50 μm, and it was then dried to form an electrolyte layer. The positive electrode, the electrolyte layer and the negative electrode were laminated with each other in this order and the resulting laminate was subjected to thermal compression bonding to form a sheet-like electrode body.

A positive electrode lead and a negative electrode lead, each made of Ni, were respectively connected to a positive electrode current collector and a negative electrode current collector, and then the resulting electrode bodies were housed by a laminate packaging material formed into a bag having an opening portion and the opening portion was sealed by thermal compression bonding under reduced pressure to obtain a sheet-like battery.

EXAMPLE 18

In the same manner as in Example 17, except that the modified polymer used in the bonding layer was replaced by a modified polymer (methacrylic acid grafting polyvinylidene fluoride, MA-g-PVdF) represented by the above chemical scheme (2) obtained by graft polymerization of 17% by weight of methacrylic acid and polyvinylidene fluoride, a battery was produced.

EXAMPLE 19

In the same manner as in Example 17, except that the content of an acidic polymer dispersant was controlled to 10.7% by weight based on the weight of the solid material by adding 1.2 g of a dispersant when a conductive material is dispersed in a solvent in the preparation of a slurry for a bonding layer, a battery was produced.

EXAMPLE 20

In the same manner as in Example 18, except that the content of an acidic polymer dispersant was controlled to 10.7% by weight based on the weight of the solid material by adding 1.2 g of a dispersant when a conductive material is dispersed in a solvent in the preparation of a slurry for a bonding layer, a battery was produced.

EXAMPLE 21

In the same manner as in Example 17, except that the dry thickness of the bonding layer formed on the positive electrode current collector and the dry thickness of the bonding layer formed on the negative electrode current collector were respectively controlled to 0.5 μm, a battery was produced.

EXAMPLE 22

In the same manner as in Example 17, except that the dry thickness of the bonding layer formed on the positive electrode current collector and the dry thickness of the bonding layer formed on the negative electrode current collector were respectively controlled to 1 μm, a battery was produced.

EXAMPLE 23

In the same manner as in Example 17, except that the dry thickness of the bonding layer formed on the positive electrode current collector and the dry thickness of the bonding layer formed on the negative electrode current collector were respectively controlled to 10 μm, a battery was produced.

EXAMPLE 24

In the same manner as in Example 17, except that the dry thickness of the bonding layer formed on the positive electrode current collector and the dry thickness of the bonding layer formed on the negative electrode current collector were respectively controlled to 15 μm, a battery was produced.

EXAMPLE 25

In the same manner as in Example 17, except that a weight ratio of the binder to the conductive material was controlled to 50/50 by using 2 g of powdered graphite as the conductive material of the coating slurry for a bonding layer, a battery was produced.

EXAMPLE 26

In the same manner as in Example 17, except that a weight ratio of the binder to the conductive material was controlled to 33/67 by using 4 g of powdered graphite as the conductive material of the coating slurry for a bonding layer, a battery was produced.

EXAMPLE 27

In the same manner as in Example 17, except that a weight ratio of the binder to the conductive material was controlled to 14/86 by using 12 g of powdered graphite as the conductive material of the coating slurry for a bonding layer, a battery was produced.

EXAMPLE 28

In the same manner as in Example 17, except that a weight ratio of the binder to the conductive material was controlled to 13/87 by using 14 g of powdered graphite as the conductive material of the coating slurry for a bonding layer, a battery was produced.

COMPARATIVE EXAMPLE 9

In the same manner as in Example 17, except that the bonding layer was not provided on the positive electrode current collector and the negative electrode current collector, a battery was produced.

COMPARATIVE EXAMPLE 10

In the same manner as in Example 17, except that the binder AA-g-PVdF of the coating slurry for a bonding layer was replaced by a butyl rubber and the solvent DMA was replaced by toluene, a battery was produced.

COMPARATIVE EXAMPLE 11

In the same manner as in Example 17, except that the binder AA-g-PVdF of the coating slurry for a bonding layer was replaced by an acrylate ester-methacrylate ester copolymer and the solvent DMA was replaced by water, a battery was produced.

COMPARATIVE EXAMPLE 12

In the same manner as in Example 17, except that the binder AA-g-PVdF of the coating slurry for a bonding layer was replaced by a polyurethane resin and the solvent DMA was replaced by a mixed solvent of 108 g of methyl ethyl ketone and 72 g of methyl isobutyl ketone, a battery was produced.

COMPARATIVE EXAMPLE 13

In the same manner as in Example 17, except that the binder AA-g-PVdF of the coating slurry for a bonding layer was replaced by an epoxy resin and the solvent DMA was replaced by a mixed solvent of 108 g of methyl ethyl ketone and 72 g of methyl isobutyl ketone, a battery was produced.

COMPARATIVE EXAMPLE 14

In the same manner as in Example 17, except that the content of an acidic polymer dispersant was controlled to 26% by weight by adding 3.5 g of a dispersant when a conductive material was dispersed in a solvent in the preparation of a slurry for a bonding layer, a battery was produced.

COMPARATIVE EXAMPLE 15

In the same manner as in Example 17, except that the dry thickness of the bonding layer formed on the positive electrode current collector and the dry thickness of the bonding layer formed on the negative electrode current collector were respectively controlled to 40 μm, a battery was produced.

COMPARATIVE EXAMPLE 16

In the same manner as in Example 17, except that a weight ratio of the binder to the conductive material was controlled to 9/91 by using 20 g of powdered graphite as the conductive material of the coating slurry for a bonding layer, a battery was produced.

Comparative Evaluation

With respect to the batteries obtained in Examples 17 to 28 and Comparative Examples 9 to 16, the following evaluation tests were conducted.

(5) Test for Resistance of Bonding Layer to Electrolytic Solution

The negative electrode current collectors having a bonding layer obtained in Examples 17 to 28 and Comparative Examples 9 to 16 were dipped in an electrolytic solution comprising 20 parts by weight of propylene carbonate, 40 parts by weight of ethylene carbonate and 40 parts by weight of diethyl carbonate for one week, and then an increase in weight of the negative electrode current collectors having a bonding layer was measured, and it was determined whether or not the modified polymer as the third binder of the bonding layer is swollen with the electrolytic solution. Also, it was determined whether or not the bonding layer was peeled off by rubbing the Cu foils as the negative electrode current collectors with the fingers.

(6) Test for Current Collector Protection Performances of Bonding Layer to Hydrogen Fluoride (HF)

On the surface of the negative electrode current collectors having a bonding layer obtained in Examples 17 to 28 and Comparative Examples 9 to 16, 2 ml of an aqueous hydrofluoric acid solution having a concentration of 5 ppm was added dropwise, and after standing for 24 hours, the state of the current collectors was determined.

(7) Test for Adhesion of Bonding Layer to Active Material Layer

On the surface of each of the positive electrode current collectors and the negative electrode current collectors of positive and negative electrodes obtained in Examples 17 to 28 and Comparative Examples 9 to 16, an adhesive tape was applied and a rubber roller was pressed against the surface. The positive electrode current collectors and negative electrode current collectors with the adhesive tape applied thereon were cut into pieces having a width of 10 mm, and then current collectors having a width of 10 mm was vertically pulled upward and a force required to peel off the active material layer was measured. Also the manner of peeling was visually confirmed.

(8) Test for Cycle Capacity Maintaining Characteristics

After the sheet-like batteries obtained in Examples 17 to 28 and Comparative Examples 9 to 16 were subjected to the test for charge-discharge cycles, a charge-discharge cycle comprising a charge step of charging the resulting sheet-like battery under the conditions of a maximum charge voltage of 4.2 V and a charge current of 0.5 A for 2.5 hours and a discharge step of discharging at a constant current of 0.5 A until the discharge voltage was reduced to 2.75 V (minimum discharge voltage) was repeated. Then, a charge-discharge capacity of each cycle was measured and the number of cycles required to reduce to 80% of an initial discharge capacity was measured.

The results in the evaluation tests (5) to (8) are shown in Table 5. Symbols in the column of the evaluation test (5) shown in Table 5 have the following meanings.

◉: excellent adhesion; no peeling
○: good adhesion; no peeling
Δ: partial peeling
×: complete peeling Symbols in the column of the evaluation test (6) shown in Table 5 have the following meanings.

◉: excellent corrosion resistance; no corrosion
○: good corrosion resistance; no corrosion
Δ: partial corrosion
×: corrosion

TABLE 5

| | Evaluation test (5) Dipping in electrolytic solution | | Evaluation test (6) | Evaluation test (7) | Evaluation test (8) |
|---|---|---|---|---|---|
| | Increase [% by weight] | Peel resistance | Protection ability to HF | Adhesion force {N} | 80% Capacity cycle number [times] |
| Example 17 | 0.8 | ◉ | ◉ | 12.1 | 635 |
| Example 18 | 1.1 | ◉ | ◉ | 11.8 | 565 |
| Example 19 | 0.9 | ◉ | ◉ | 12.3 | 604 |
| Example 20 | 1.0 | ◉ | ◉ | 11.8 | 539 |
| Example 21 | 0.5 | ◉ | ○ | 12.2 | 346 |
| Example 22 | 0.7 | ◉ | ○ | 9.0 | 545 |
| Example 23 | 1.9 | ◉ | ◉ | 10.8 | 589 |
| Example 24 | 2.5 | ○ | ◉ | 10.6 | 444 |
| Example 25 | 0.4 | ◉ | ◉ | 12.0 | 329 |
| Example 26 | 0.6 | ◉ | ◉ | 11.0 | 566 |
| Example 27 | 1.2 | ○ | ○ | 10.0 | 468 |
| Example 28 | 1.8 | ○ | ○ | 9.3 | 375 |

|  | Evaluation test (5) Dipping in electrolytic solution | | Evaluation test (6) | Evaluation test (7) | Evaluation test (8) |
| --- | --- | --- | --- | --- | --- |
|  | Increase [% by weight] | Peel resistance | Protection ability to HF | Adhesion force {N} | 80% Capacity cycle number [times] |
| Comparative Example 9 | — | — | X | 0.5 | 15 |
| Comparative Example 10 | 83.2 | X | Δ | 2.1 | 135 |
| Comparative Example 11 | 34.8 | Δ | X | 3.6 | 194 |
| Comparative Example 12 | 51.1 | Δ | Δ | 3.7 | 203 |
| Comparative Example 13 | 25.7 | Δ | Δ | 2.6 | 178 |
| Comparative Example 14 | 0.9 | Δ | ○ | 5.6 | 280 |
| Comparative Example 15 | 6.0 | Δ | ⊙ | 14 | 213 |
| Comparative Example 16 | 2.9 | Δ | ○ | 4.8 | 187 |

(5) Test for Resistance of Bonding Layer to Electrolytic Solution

In Comparative Examples 10 to 13, the increase in weight of the negative electrode current collector having a bonding layer is large and the binder, which forms the bonding layer, is swollen with the electrolytic solution. On the other hand, in Examples 17 to 28, regardless of immersion in the electrolytic solution for one week, the increase in weight of the negative electrode current collectors having a bonding layer is very small and the negative electrode current collectors are excellent in resistance to the electrolytic solution.

(6) Test for Current Collector Protection Performances of Bonding Layer to Hydrogen Fluoride (HF)

The current collectors of Comparative Examples 9 and 11 were corroded by HF. Also the current collectors of Comparative Example 10, 12, and 13 were partially corroded. On the other hand, the current collectors of Examples 17 to 28 are not corroded by HF and it was found that the bonding layer exerts a protective effect.

(7) Test for Adhesion of Bonding Layer to Active Material Layer

As compared with the adhesion of Comparative Examples 9 to 16, a force required to peel off the active material layer is large in Examples 17 to 28. In Comparative Examples 9 to 16, the peeled portion and the non-peeled portion simultaneously existed at the surface. In contrast, the active material layer was uniformly peeled off over the entire surface in Examples 17 to 28.

(8) Test for Cycle Capacity Maintaining Characteristics

As compared with 80% capacity cycle number of Comparative Examples 9 to 16, the batteries of Examples 17 to 28 exhibit high cycle number, and it was found that these batteries were excellent in cycle maintaining characteristics due to charge and discharge.

EXAMPLE 29

First, 2 g of a polymer material (acrylic acid grafting polyvinylidene fluoride, hereinafter referred to as AA-g-PVdF) obtained by graft polymerization of 17% by weight of acrylic acid and polyvinylidene fluoride was prepared as a main component of first and second binders. 2 g of the resulting AA-g-PVdF was dissolved in 98 g of dimethylacetamide (hereinafter referred to as DMA) as a solvent using a homogenizer to obtain first and second binder material solutions. 8 g of aluminum having a particle size of 1 μm was prepared as a first conductive material and 8 g of copper having a particle size of 1 μm was prepared as a second conductive material, and then these metal powders were dispersed in 80 g of DMA to prepare first and second dispersions. The resulting first and second dispersions were added to the above binder material solution to prepare slurries for first and second bonding layers.

An Al foil having a thickness of 20 μm and a width of 250 mm was prepared as a positive electrode current collector, and then the slurry for a first bonding layer was applied on the Al foil and was dried to obtain an Al foil with a first bonding layer having a dry thickness of 5 μm. A copper foil having a thickness of 10 μm and a width of 250 mm was prepared as a negative electrode current collector, and then the slurry for a second bonding layer was applied on the Cu foil and was dried to obtain a copper foil with a second bonding layer having a dry thickness of 5 μm.

The above-mentioned respective components shown in Table 6 below were mixed in a ball mill for 2 hours to prepare a coating slurry for a positive electrode active material layer, a coating slurry for a negative electrode active material layer, and a coating slurry for an electrolyte layer.

TABLE 6

| Positive electrode active material component | Parts by weight | Negative electrode active material component | Parts by weight | Polymer electrolyte component | Parts by weight |
| --- | --- | --- | --- | --- | --- |
| LiCoO$_2$ | 90 | Powdered graphite | 90 | Vinylidene fluoride-hexafluoropropylene copolymer | 17 |
| Powdered graphite | 6 | Polyvinylidene fluoride | 10 | Propylene carbonate | 15 |
| Polyvinylidene fluoride | 4 | N-methyl-pyrrolidone | 50 | Ethylene carbonate | 30 |
| N-methyl-pyrrolidone | 45 | | | Diethyl carbonate | 30 |
| | | | | LiPF$_6$ | 8 |
| | | | | Acetone | 80 |

The resulting coating slurry for a positive electrode active material layer was applied on the surface of the Al foil having the bonding layer so that the dry thickness of the positive electrode active material layer was 80 μm, was dried, and was then rolled to form a positive electrode. The resulting coating slurry for a negative electrode active material layer was applied on the surface of the Cu foil having the bonding layer so that the dry thickness of the positive electrode active material layer was 80 μm, was dried, and was then rolled to form a negative electrode. The resulting coating slurry for an electrolyte layer was applied on a release paper having a thickness of 25 μm and a width of 250 mm so that the dry thickness of the electrolyte layer was 50 μm, and it was then dried to form an electrolyte layer. The positive electrode, the electrolyte layer, and the negative electrode were laminated with each other, in this order, and the resulting laminate was subjected to thermal compression bonding to form a sheet-like electrode body.

A positive electrode lead and a negative electrode lead, each made of Ni, were respectively connected to a positive electrode current collector and a negative electrode current collector, and then the resulting electrode bodies were housed by a laminate packaging material formed into a bag having an opening portion, and the opening portion was sealed by thermal compression bonding under reduced pressure to obtain a sheet-like battery.

EXAMPLE 30

In the same manner as in Example 29, except that the particle size of aluminum as the first conductive material and the particle size of copper as the second conductive material were changed to 0.1 μm, a lithium ion polymer secondary battery was produced.

EXAMPLE 31

In the same manner as in Example 29, except that the particle size of aluminum as the first conductive material and the particle size of copper as the second conductive material were changed to 20 μm, a lithium ion polymer secondary battery was produced.

EXAMPLE 32

In the same manner as in Example 29, except that the weight ratio of the first binder to the first conductive material (first binder/first conductive material) and the weight ratio of the second binder to the second conductive material (second binder/second conductive material) were respectively changed to 13/87, a lithium ion polymer secondary battery was produced.

EXAMPLE 33

In the same manner as in Example 29, except that the weight ratio of the first binder to the first conductive material (first binder/first conductive material) and the weight ratio of the second binder to the second conductive material (second binder/second conductive material) were respectively changed to 75/25, a lithium ion polymer secondary battery was produced.

EXAMPLE 34

In the same manner as in Example 29, except that platinum was used as the first conductive material, a lithium ion polymer secondary battery was produced.

EXAMPLE 35

In the same manner as in Example 29, except that nickel was used as the second conductive material, a lithium ion polymer secondary battery was produced.

EXAMPLE 36

In the same manner as in Example 29, except that the acidic polymer dispersant was added to the first and second bonding layers, a lithium ion polymer secondary battery was produced.

EXAMPLE 37

In the same manner as in Example 29, except that the neutral polymer dispersant was added to the first and second bonding layers, a lithium ion polymer secondary battery was produced.

COMPARATIVE EXAMPLE 17

In the same manner as in Example 29, except that a powdered carbon material having a specific surface area of 150 cm$^2$/g was used as the first and second conductive materials, a lithium ion polymer secondary battery was produced.

COMPARATIVE EXAMPLE 18

In the same manner as in Example 29, except that the particle size of aluminum as the first conductive material and the particle size of copper as the second conductive material were changed to 0.05 μm, a lithium ion polymer secondary battery was produced.

COMPARATIVE EXAMPLE 19

In the same manner as in Example 29, except that the particle size of aluminum as the first conductive material and the particle size of copper as the second conductive material were changed to 25 µm, a lithium ion polymer secondary battery was produced.

COMPARATIVE EXAMPLE 20

In the same manner as in Example 29, except that the weight ratio of the first binder to the first conductive material (first binder/first conductive material) and the weight ratio of the second binder to the second conductive material (second binder/second conductive material) were respectively changed to 10/90, a lithium ion polymer secondary battery was produced.

COMPARATIVE EXAMPLE 21

In the same manner as in Example 29, except that the weight ratio of the first binder to the first conductive material (first binder/first conductive material) and the weight ratio of the second binder to the second conductive material (second binder/second conductive material) were respectively changed to 80/20, a lithium ion polymer secondary battery was produced.

Comparative Evaluation

With respect to the batteries obtained in Examples 29 to 37 and Comparative Examples 17 to 21, the following evaluation tests were conducted.

(1) Tear Off Test

This test was conducted by using a tensile testing machine (Tensilon UCT-500, manufactured by Orientec Co., Ltd.) after cutting a sheet-like electrode body into pieces having a width of 50 mm. After the electrode body having a width of 50 mm was fixed by a pair of chucks having a distance of 100 mm, one chuck was pulled at a pulling rate of 300 mm/min and the load required to break the electrode body was measured. The resulting value was taken as the adhesion force.

(2) Test for Output Characteristics

After these batteries were charged until a voltage between terminals of batteries was 4.0 [V] at a current value represented by 1/5 C [mA] in a case in which each discharge capacity of the batteries is expressed as 1 C [mAh], they were charged while being maintained at 4.0 [V] for 5 hours in total and were allowed to stand for one hour. Then, the discharge capacity was measured after discharging until the voltage was 2.7 [V] at a current value of 3 C [mA]. A percentage of a discharge capacity obtained when discharged at a current value expressed by 3 C [mA] to a discharge capacity obtained when discharged at a current value expressed by 1/5 C [mA] was determined.

(3) Test for Cycle Capacity Maintaining Characteristics

Cycle lifetime of these batteries was determined by the number of charge-discharge cycles until the discharge capacity is reduced to 80% of an initial discharge capacity $C_{MAX}$.

The results of the evaluation tests (1) to (3) are respectively shown in Table 7.

TABLE 7

|  | Adhesion force [N] | Output characteristics [%] | Cycle characteristics [times] |
|---|---|---|---|
| Example 29 | 59.2 | 95.8 | 851 |
| Example 30 | 47 | 97.4 | 699 |
| Example 31 | 51.2 | 94.6 | 893 |
| Example 32 | 67 | 98.7 | 658 |
| Example 33 | 46.2 | 92.4 | 994 |
| Example 34 | 55.8 | 97.7 | 814 |
| Example 35 | 58 | 96.7 | 772 |
| Example 36 | 52.8 | 97.9 | 781 |
| Example 37 | 57 | 96.3 | 732 |
| Comparative Example 17 | 36.2 | 90.8 | 635 |
| Comparative Example 18 | 40.8 | 90.2 | 534 |
| Comparative Example 19 | 40 | 87.5 | 473 |
| Comparative Example 20 | 25.6 | 88.5 | 139 |
| Comparative Example 21 | 45.8 | 67.5 | 758 |

As is apparent from the results of the tear off test shown in Table 7, the battery of Comparative Example 17, wherein no metal is used in the first and second bonding layers, has low adhesion force and is likely to cause peeling. In the batteries of Comparative Examples 18 and 19 wherein the particle size of metal contained in the first and second bonding layers is not within the scope of the present invention, since particles having a small particle size agglomerated (Comparative Example 18) and particles have a large particle size and are coarse, and thus, conductive materials are not sufficiently in contact (Comparative Example 19), the results of the respective evaluation tests exhibited low numerical values. The battery of Comparative Example 20 was inferior in adhesion and cycle characteristics, while the battery of Comparative Example 21 was inferior in output characteristics. On the other hand, the batteries of Examples 29 to 37 are excellent in adhesion, output characteristics, and cycle characteristics, as compared with the battery of the prior art.

EXAMPLE 38

2 g of a particulate acrylic acid grafting polyvinylidene fluoride having a mean particle size of 200 µm (hereinafter referred to as AA-g-PVdF) as a binder and 98 g of dimethylacetamide (hereinafter referred to as DMA) was prepared as a solvent, and then the two were mixed. The resulting mixed solution was heated to 85° C. and continuously stirred using a homogenizer. The solution was collected while stirring and applied on a transparent glass substrate so that the resulting liquid film had a thickness of about 200 µm, and then a mean particle size of polymer binder particles (undissolved particles) and the number of polymer binder particles (undissolved particles) having a particle size of 1 µm or more were determined by using an optical microscope.

The particle size of the particles was measured by definition of a projected equivalent circle diameter and its measuring method. The particle size was measured as a diameter of a circle equivalent to a projected area of the particles by the following procedure. That is, the particles arranged in a plane were observed from directly above using a means such as an optical microscope, electron microscope or close-up photography, and the particle size was determined by the resulting projected drawing of the particles. Then, a mean particle size D was determined by weighting according to the following equation:

$$D=[\Sigma nd^3/\Sigma n]^{1/3}$$

where d denotes a mean particle size obtained by the above method and n denotes the number of particles.

When the mean particle size of the polymer binder particles became 30±10 μm and the number of the polymer binder particles having a particle size of 1 μm or more became 20±10/cm$^2$, stirring was stopped. A solution containing the resulting polymer binder particles was taken as a polymer solution of Example 38.

EXAMPLE 39

1.5 g of particulate AA-g-PVdF having a mean particle size of 200 μm was prepared as a binder and then mixed with 98 g of DMA. The resulting mixed solution was heated to 85° C. and continuously stirred by using a homogenizer. The resulting AA-g-PVdF was completely dissolved and 0.5 g of particulate AA-g-PVdF having a mean particle size of 100 μm were further added, followed by stirring for an additional 5 minutes using a homogenizer to obtain a polymer binder particle-containing polymer solution. The resulting solution was collected and applied on a transparent glass substrate so that the resulting liquid film had a thickness of about 200 μm, and then the mean particle size of polymer binder particles (undissolved particles) and the number of polymer binder particles (undissolved particles) having a particle size of 1 μm or more were determined by an optical microscope. As a result, the mean particle size of the polymer binder particles was 20±10 μm and the number of the polymer binder particles having a particle size of 1 μm or more was 20±10/cm$^2$. The resulting polymer binder particle-containing solution was taken as a polymer solution of Example 39.

EXAMPLE 40

In the same manner as in Example 38, 2 g of AA-g-PVdF having a mean particle size of 200 μm and 98 g of DMA were prepared and the two were continuously stirred under the same conditions as in Example 38. The resulting solution was often collected, and then the mean particle size of polymer binder particles (undissolved particles) and the number of polymer binder particles (undissolved particles) having a particle size of 1 μm or more were determined by an optical microscope under the same conditions as in Example 38. When the mean particle size of the polymer binder particles became 10±5 μm and the number of the polymer binder particles having a particle size of 1 μm or more became 10±5/cm$^2$, stirring was stopped. The resulting polymer binder particles-containing solution was taken as a polymer solution of Example 40.

EXAMPLE 41

2 g of a particulate methacrylic acid grafting polyvinylidene fluoride having a mean particle size of 200 μm was prepared as a binder and 98 g of DMA were prepared, and then the two were continuously stirred under the same conditions as in Example 38. The resulting solution was often collected, and then the mean particle size of polymer binder particles (undissolved particles) and the number of polymer binder particles (undissolved particles) having a particle size of 1 μm or more were determined by an optical microscope under the same conditions as in Example 38. When the mean particle size of the polymer binder particles became 30±10 μm and the number of the polymer binder particles having a particle size of 1 μm or more became 20±10/cm$^2$, stirring was stopped. The resulting polymer binder particle-containing solution was taken as a polymer solution of Example 41.

COMPARATIVE EXAMPLE 22

In the same manner as in Example 38, 2 g of AA-g-PVdF having a mean particle size of 200 μm was prepared as a binder and then mixed with 98 g of DMA. The resulting mixed solution was heated to 85° C. and was continuously stirred using a homogenizer until AA-g-PVdF is completely dissolved. The resulting solution was collected and applied on a transparent glass substrate so that the resulting liquid film had a thickness of about 200 μm, and then it was confirmed by an optical microscope that polymer binder particles (undissolved particles) having a particle size of 1 μm or more were not present. The resulting polymer binder particle-containing solution was taken as a polymer solution of Comparative Example 22.

COMPARATIVE EXAMPLE 23

In the same manner as in Example 39, 1.5 g of AA-g-PVdF having a mean particle size of 200 μm was prepared as a binder and was then mixed with 98 g of DMA. The resulting mixed solution was heated to 85° C. and was continuously stirred using a homogenizer. AA-g-PVdF was completely dissolved and 0.5 g of the particulate AA-g-PVdF having a mean particle size of 200 μm was further added, followed by stirring for an additional one minute using a homogenizer to obtain a polymer solution. The resulting solution was collected and applied on a transparent glass substrate so that the resulting liquid film had a thickness of about 200 μm, and then the mean particle size of polymer binder particles (undissolved particles) and the number of polymer binder particles (undissolved particles) having a particle size of 1 μm or more were determined by using an optical microscope. As a result, the mean particle size of the polymer binder particles was 120±10 μm and the number of the polymer binder particles having a particle size of 1 μm or more was 80±10/cm$^2$. The resulting polymer binder particles-containing solution was taken as a polymer solution of Example 23.

COMPARATIVE EXAMPLE 24

In the same manner as in Example 39, 1 g of AA-g-PVdF having a mean particle size of 200 μm was prepared as a binder and was then mixed with 98 g of DMA. The resulting mixed solution was heated to 85° C. and was continuously stirred using a homogenizer. AA-g-PVdF was completely dissolved and 1 g of the particulate AA-g-PVdF having a mean particle size of 100 μm was further added, followed by stirring for an additional 2 minutes using a homogenizer to obtain a polymer solution. The resulting solution was collected and applied on a transparent glass substrate so that the resulting liquid film had a thickness of about 200 μm, and then the mean particle size of polymer binder particles (undissolved particles) and the number of polymer binder particles (undissolved particles) having a particle size of 1 μm or more were determined by using an optical microscope. As a result, the mean particle size of the polymer binder particles was 60±10 μm and the number of the polymer binder particles having a particle size of 1 μm or more was 150±10/cm². The resulting polymer binder particles-containing solution was taken as a polymer solution of Example 24.

COMPARATIVE EXAMPLE 25

In the same manner as in Example 41, 2 g of a particulate methacrylic acid grafting polyvinylidene fluoride having a mean particle size of 200 µm, as a binder, was mixed with 98 g of DMA. The resulting mixed solution was heated to 85° C. and was stirred using a homogenizer until polytetrafluoroethylene is completely dissolved. The resulting solution was collected and was applied on a transparent glass substrate so that the resulting liquid film had a thickness of about 200 µm, and then it was confirmed by using an optical microscope that polymer binder particles (undissolved particles) having a particle size of 1 µm or more were not present. The resulting polymer binder particle-containing solution was taken as a polymer solution of Comparative Example 25.

Figure 10:
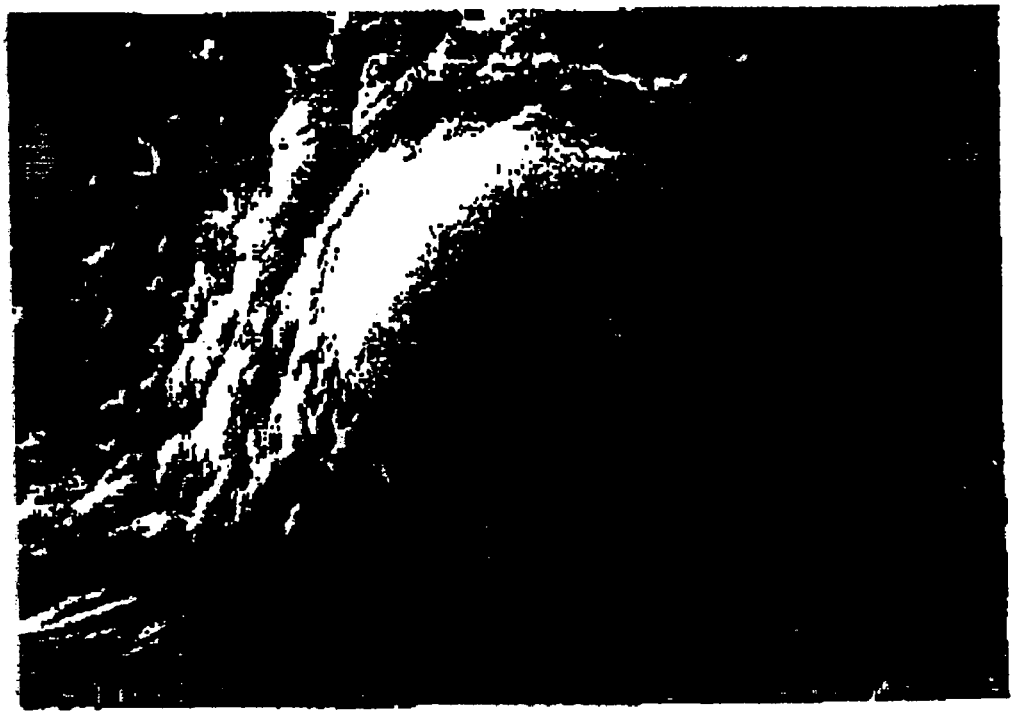
FIG. 10 is an electron micrograph showing binder particles obtained by applying and drying a polymer solution of Example 38.

Comparative Test and Evaluation (1) Test for Adhesion with Copper Foil and Aluminum Foil First, each of the polymer solutions obtained in Examples 38 to 41 and Comparative Examples 22 to 25 was uniformly applied on a Cu foil having a width of 30 mm, a length of 200 mm and a thickness of 14 µm, the surface of which was degreased, and then an Al foil having a width of 10 mm, a length of 100 mm, and a thickness of 20 µm, the surface of which was degreased, was applied thereon to produce a peel specimen for adhesion testing. The resulting specimen was dried in atmospheric air at 80° C. for 5 days using a dryer. Then, the binding of the dried specimen to the Cu foil and the Al foil was evaluated by a machine for peeling testing. In the peeling test, the Cu foil side of the specimen was fixed to a testing stand and the Al foil bonded to the Cu foil was vertically pulled upward at a rate of 100 mm/min, and then a force required to peel off the Al foil from the Cu foil (peel strength) was measured. The polymer solution of Example 38 was applied on a copper foil and then dried. An electron micrograph of the binder particles is shown in FIG. 10.

(2) Test for Cycle Capacity Maintaining Characteristics of Battery When Used in Bonding Layer of Battery First, to 100 g of each of the polymer solutions obtained in Examples 38 to 41 and Comparative Examples 22 to 25, 8 g of powdered graphite having a specific surface area of 150 m²/g and 80 g of DMA were added to prepare a slurry for a bonding layer. After preparing an Al foil having a thickness of 20 µm and a width of 250 µm as a positive electrode current collector, the resulting slurry for a bonding layer was applied on the Al foil by a doctor blade method and was then dried. The thickness of the bonding layer after drying was controlled within a range of 20±1 µm. After preparing a Cu foil having a thickness of 14 µm and a width of 250 µm as a negative electrode current collector, the resulting slurry for a bonding layer was applied on the Cu foil by a doctor blade method and was then dried. The thickness of the bonding layer after drying was controlled within a range of 20±1 µm. The respective components shown in Table 8 below were mixed in a ball mill for 2 hours to prepare a coating slurry for a positive electrode active material layer, a coating slurry for a negative electrode active material layer and coating slurry for an electrolyte layer.

TABLE 8

| | Coating slurry component | Parts by weight |
| --- | --- | --- |
| Positive electrode active material layer | LiCoO₂ | 90 |
| | Powdered graphite | 6 |
| | PVdF | 4 |
| | N-methyl pyrrolidone | 45 |
| Negative electrode active material layer | Powdered graphite | 90 |
| | PVdF | 10 |
| | N-methyl pyrrolidone | 50 |
| Electrolyte layer | Vinylidene fluoride-hexafluoropropylene copolymer | 17 |
| | Propylene carbonate | 15 |
| | Ethylene carbonate | 30 |
| | Diethyl carbonate | 30 |
| | LiPF₆ | 8 |
| | Acetone | 80 |

The resulting coating slurry for a positive electrode active material layer was applied on the surface of the Al foil having the bonding layer by a doctor blade method so that the dry thickness of the positive electrode active material layer was 80 µm, was dried, and was then rolled to form a positive electrode. Similarly, the coating slurry for a negative electrode active material layer was applied on the surface of the Cu foil having the bonding layer by a doctor blade method so that the dry thickness of the positive electrode active material layer was 80 µm, was dried, and was then rolled to form a negative electrode. Furthermore, the coating slurry for an electrolyte layer was respectively applied on the positive electrode and the negative electrode by a doctor blade method so that each dry thickness was 50 µm, and then the positive and negative electrodes, each having an electrolyte layer, were laminated with each other by thermal compression bonding to yield a sheet-like electrode bodies. In the resulting sheet-like electrode bodies, a positive electrode lead and a negative electrode lead, each made of Ni, were respectively connected to a positive electrode current collector and a negative electrode current collector, and then the sheet-like electrode bodies were housed by a laminate packaging material formed into a bag having an opening portion, and the opening portion was sealed by thermal compression bonding under reduced pressure to obtain a sheet-like battery.

Then, a charge-discharge cycle comprising a charge step of charging the resulting sheet-like battery under the conditions of a maximum charge voltage of 4 V and a charge current of 0.5 A for 2.5 hours, and a discharge step of discharging at a constant current of 0.5 A until the discharge voltage was reduced to a minimum discharge voltage of 2.75 V, was repeated, and then a charge-discharge capacity of each cycle was measured, and the number of cycles required to reduce to 80% of an initial discharge capacity was measured.

(3) Test for Adhesion of Bonding Layer to Current Collector When Used in Bonding Layer of Battery First, the same sheet-like batteries as those for the above-mentioned evaluation test (2) were prepared by using the polymer solutions obtained in Examples 38 to 41 and Comparative Examples 22 to 25. Under the conditions of 70° C., 100 charge-discharge cycles of the resulting batteries were conducted under the same conditions as those in the evaluation test (2). After the completion of 100 charge-discharge cycles, the housing package of the sheet-like battery was removed and the positive electrode and the negative electrode of the battery were detached and separated. It was then determined whether or not the bonding layer would peeled off from the current collector when pulling the bonding layers of the separated positive and negative electrodes using forceps.

The evaluation results in the evaluation tests (1) to (4) are shown in Table 9. Symbols in the column of the evaluation test (3) in Table 9 have the following meanings.

⊚: excellent adhesion of bonding layer to current collector; not peeled off
○: bonding layer was partially peeled off from current collector
×: bonding layer was completely peeled off from current collector

TABLE 9

| | Evaluation test (2) Peel strength | Evaluation test (3) 80% Capacity cycle | Evaluation test (4) Adhesion of bonding layer to current collector after 100 cycles | |
|---|---|---|---|---|
| | [N/cm] of Cu and Al bonded | number [times] of battery | Positive electrode current collector | Negative electrode current collector |
| Example 38 | 20.58 | 680 | ⊚ | ⊚ |
| Example 39 | 19.60 | 675 | ⊚ | ⊚ |
| Example 40 | 18.62 | 657 | ⊚ | ⊚ |
| Example 41 | 19.70 | 648 | ⊚ | ○ |
| Comparative Example 22 | 15.68 | 523 | ⊚ | ⊚ |
| Comparative Example 23 | 13.72 | 506 | ⊚ | ⊚ |
| Comparative Example 24 | 13.72 | 459 | ⊚ | ○ |
| Comparative Example 25 | 15.29 | 495 | ⊚ | ○ |

As is apparent from Table 9, in the test for adhesion with the Cu foil and the Al foil as the evaluation test (1), any Al foil bonded to the Cu foil using the polymer solutions of Examples 38 to 4 exhibited a peel strength from the Cu foil of 18.6 N/cm or higher. On the other hand, when using the polymer solutions of Comparative Examples 22 to 25, the peel strength decreased by 4.41 to 5.88 N/cm as compared with the peel strength of Examples 38 to 41. This is caused by the presence or absence of the particulate polymer binder, and it is believed that the adhesion was improved by the presence of the particulate polymer binder. In the test for cycle capacity maintaining characteristics as the evaluation test (2), 80% capacity cycle number of the batteries using the polymer binder of Examples 38 to 41 is higher than that of the batteries using the polymer solutions of Comparative Examples 22 to 25. The reason for this is believed to be that cycle capacity maintaining characteristics were improved because the polymer binders of Examples 38 to 41 are excellent in adhesion and are also excellent in durability to the electrolytic solution.

In Examples 38 to 40 wherein the number of particles having a mean particle size of 1 to 100 μm present in the polymer solution is 100/cm², the mean particle size exceeds 100 μm, or the number of cycles is higher than that of Comparative Examples 23 and 24 wherein the number of particles having a mean particle size of 1 μm more exceed 100/cm².

Furthermore, in the test for adhesion of the bonding layer to the current collector as the evaluation test (3), Examples 38 and 39 as well as Comparative Examples 22 and 23 exhibited high adhesion. As is apparent from a comparison between Examples 38 to 40 and Example 41, when using methacrylic acid grafting polyvinylidene fluoride as a binder, the adhesion is reduced as compared with the case of using AA-g-PVdF. However, regarding Example 41 wherein methacrylic acid grafting polyvinylidene fluoride having comparatively poor adhesion characteristics is used as a polymer binder and a portion of the binder is allowed to exist in the bonding layer in the form of particles, the adhesion of the bonding layer to the current collector (evaluation test (3)) after 100 cycles is almost the same as in the case of Comparative Example 25 using completely dissolved polymer binder. However, regarding the evaluation test (1) (peel strength of Cu and Al bonded) and evaluation test (2) (80% capacity cycle number of battery) (both of them serve as a measure of adhesion in a broad sense), in Example 41 wherein a portion of the binder is allowed to exist in the bonding layer in the form of particles, adhesion in a broad sense is improved and characteristics of the battery can be improved as compared with Comparative Example 25 using completely dissolved polymer binder

INDUSTRIAL APPLICABILITY

According to the first aspect of the present invention, in a lithium ion polymer secondary battery, a first bonding layer is interposed between the positive electrode current collector and the positive electrode active material layer, and a second bonding layer is interposed between the negative electrode current collector and the negative electrode active material layer, the first and second bonding layers contain both a third binder and a conductive material, while the third binder is a polymer compound obtained by modifying either or both of the polymer compounds contained in the first and second binders, or a polymer compound obtained by modifying a polymer compound having any of repeating units of the polymer compounds, with a modifying material. Therefore, the modified polymer made of the first or second binder as a main component has high adhesion with the positive electrode active material layer or negative electrode active material layer and also adhesion with the current collector is remarkably improved by modification as compared with the case of using the binder of the prior art. As a result, peeling of the active material layer from the current collector can be suppressed and electrical conductivity between the current collector and the active material layer is remarkably improved, thus making it possible to improve cycle capacity maintaining characteristics. Also, since the electrolytic solution scarcely penetrates into the modified polymer compound, the bonding layer is stable against an organic solvent in the electrolytic solution and is excellent in long-term storage stability. Even if strong acid such as hydrofluoric acid is generated in the battery, the modified polymer compound serves as a protective layer and can suppress the corrosion of the current collector. According to the first aspect of the present invention, such an excellent lithium ion polymer secondary battery is provided and is useful in industrial fields.

According to the second aspect of the present invention, in a lithium ion polymer secondary battery, a first bonding layer is interposed between the positive electrode current collector and the positive electrode active material layer, and a second bonding layer is interposed between the negative electrode current collector and the negative electrode active material layer, the first and second bonding layers contain both a third binder and a conductive material, while the third binder contains a polymer compound obtained by modifying a fluorine-containing polymer compound with a modifying material. Therefore, adhesion of the respective bonding layers to the positive electrode current collector or negative electrode current collector is remarkably improved as compared with the binder of the prior art. As a result, peeling of the active material layer from the current collector can be suppressed and electrical conductivity between the current collector and the active material layer is remarkably improved, thus making it possible to improve cycle capacity maintaining characteristics. Also since the electrolytic solution scarcely penetrates into the modified polymer compound, the bonding layer is stable against an organic solvent in the electrolytic solution and is excellent in long-term storage stability. Even if strong acid such as hydrofluoric acid is generated in the battery, the modified polymer compound serves as a protective layer and can suppress the corrosion of the current collector. According to the second aspect of the present invention, such an excellent lithium ion polymer secondary battery is provided and is useful in industrial fields.

According to the third aspect of the present invention, there is provided a method for synthesizing a third binder suited for use in the first and second bonding layers. Therefore, the third aspect of the present invention has characteristics which are useful in industrial fields.

A lithium ion polymer secondary battery as the third and fourth aspects of the present invention is an improvement of a lithium ion polymer secondary battery comprising a positive electrode formed by providing a positive electrode active material layer containing a binder for a positive electrode and a positive electrode active material on the surface of a positive electrode current collector, a negative electrode formed by providing a negative electrode active material layer containing a binder for a negative electrode and a negative electrode active material on the surface of a negative electrode current collector, and a polymer electrolyte layer interposed between the surface of the positive electrode active material layer of the positive electrode and the negative electrode active material layer of the negative electrode; wherein a first bonding layer containing a first binder and a first conductive material is interposed between the positive electrode current collector layer and the positive electrode active material layer; a second bonding layer containing a second binder and a second conductive material is interposed between the negative electrode current collector layer and the negative electrode active material layer; a main component of the first binder is a main component of the binder for a positive electrode and a main component of the second binder is a main component of the binder for a negative electrode; and metal or partially oxidized metal having a particle size of 0.1 to 20 μm is used as the conductive material contained in the first and second bonding layers and the metal or partially oxidized metal has higher electrical conductivity as compared with the carbon material which has conventionally been used as the conductive material. Therefore, a bonding layer having good electronic conductivity can be formed by adding a small amount of the conductive material. Since a direct current resistance component generated in the battery decreases, a battery having excellent output characteristics (rate characteristics) can be produced. Since excellent electrical conductivity can be obtained by adding a small amount of the conductive material, a volume ratio of the binder material in the bonding layer can be remarkably increased, and thus contact area of the binder material with the active material layer and the current collector increases and high adhesion force can be obtained. Furthermore, excellent adhesion and electrical conductivity can be obtained by controlling the weight ratio of the binder to the conductive material contained in the first and second bonding layers within predetermined ranges.

As a result, it is made possible to prevent peeling of the active material layer from the current collector due to winding and folding, external impact, and expansion and contraction of the active material during charge and discharge, and thus excellent charge-discharge cycle characteristics (prolonged lifetime) can be obtained. Therefore, the fourth aspect of the present invention has characteristics which are useful in industrial fields.

According to the fifth aspect of the present invention, in an electrode for secondary battery, comprising a current collector and an active material layer formed on one or both surfaces of the current collector via a bonding layer containing a polymer binder, a portion of the polymer binder is allowed to exist in the bonding layer in the form of particles, and a volume-mean particle size of the particulate polymer binder is controlled within a range from 1 to 100 μm. Therefore, the particulate polymer binder that exists in the bonding layer exists together with the conductive material, that exists in the form of particles, in the interface between the current collector and the bonding layer and in the interface between the active material layer and the bonding layer, thereby improving adhesion with the layers. The conductive material exists in the portion of interface between the current collector and the bonding layer where the particulate polymer binder does not exist and in the portion of the interface between the active material layer and the bonding layer, so that exchange of electrons is carried out smoothly in the interface because of the presence of the conductive material, and the electrical resistance can be maintained at a low level.

In this case, when a fluororesin is used as a main component of the polymer binder, an electrode for a secondary battery having high durability to the electrolytic solution can be obtained. When the polymer binder is a compound obtained by graft polymerization of polyvinylidene fluoride and acrylic acid or methacrylic acid as a monomer, an electrode for secondary battery having excellent adhesion with the current collector can be obtained. When a surface density of the particulate polymer binder in a cross section of the bonding layer parallel to the surface of the bonding layer is from 1 to 100/cm$^2$, the particulate polymer binder is distributed with a proper density in the interface between the current collector and the bonding layer and the interface between the active material layer and the bonding layer, and both adhesion and electrical conductivity in the interface can be maintained. A secondary battery using this secondary electrode for battery (sixth aspect of the present invention) has improved cycle capacity maintaining characteristics.

Therefore, the fifth and sixth aspects of the present invention have characteristics which are useful in industrial fields.

The invention claimed is:

1. A lithium ion polymer secondary battery comprising:
a positive electrode comprising a positive electrode current collector, and a positive electrode active material layer, which contains a first binder containing a polymer compound and a positive electrode active material, provided on the surface of the positive electrode current collector,
a negative electrode comprising a negative electrode current collector, and a negative electrode active material layer which contains a second binder containing a polymer compound that is the same as or different from that of the first binder, and a negative electrode active material, provided on the surface of the negative electrode current collector, and
an electrolyte,
wherein a first bonding layer is interposed between the positive electrode current collector and the positive electrode active material layer, and a second bonding layer is interposed between the negative electrode current collector and the negative electrode active material layer,
the first and second bonding layers contain both a third binder and a conductive material, and
the third binder contains a polymer compound obtained by modifying either or both of the polymer compounds contained in the first and second binders or a polymer compound having any of repeating units of the polymer compounds, with modifying material.

2. The lithium ion polymer secondary battery according to claim 1, wherein either or both of the first and second binders contains a fluorine-containing polymer compound.

3. The lithium ion polymer secondary battery according to claim 2, wherein the fluorine-containing polymer compound is selected from polytetrafluoroethylene, polychlorotrifluoroethylene, polyvinylidene fluoride, polyvinylidene fluoride-hexafluoropropylene copolymer, and polyvinyl fluoride.

4. The lithium ion polymer secondary battery according to claim 1, wherein the modifying material is a compound selected from ethylene, styrene, butadiene, vinyl chloride, vinyl acetate, acrylic acid, methyl acrylate, methyl vinyl ketone, acrylamide, acrylonitrile, vinylidene chloride, methacrylic acid, methyl methacrylate, and isoprene.

5. The lithium ion polymer secondary battery according to claim 1, wherein the thickness of the first and second bonding layers is from 0.5 to 30 μm.

6. The lithium ion polymer secondary battery according to claim 1, which further contains 0.1 to 20% by weight of a dispersant in the first and second bonding layers.

7. The lithium ion polymer secondary battery according to claim 1, wherein a particle size of the conductive material is from 0.5 to 30 μm, a carbon material having a graphitization degree of 50% or more is used as the conductive material, and a weight ratio of the third binder to the conductive material contained in the first and second bonding layers, (third binder/conductive material), is from 13/87 to 50/50.

8. A lithium ion polymer secondary battery comprising:
a positive electrode comprising a positive electrode current collector, and a positive electrode active material layer, which contains a first binder and a positive electrode active material, provided on the surface of the positive electrode current collector,
a negative electrode comprising a negative electrode current collector, and a negative electrode active material layer which contains a second binder that is the same as or different from that of the first binder, and a negative electrode active material, provided on the surface of the negative electrode current collector, and
an electrolyte,
wherein a first bonding layer is interposed between the positive electrode current collector and the positive electrode active material layer and a second bonding layer is interposed between the negative electrode current collector and the negative electrode active material layer,
the first and second bonding layers contain both the third binder and the conductive material, and
the third binder contains a polymer compound obtained by modifying a fluorine-containing polymer compound with a modifying material.

9. The lithium ion polymer secondary battery according to claim 8, wherein either or both of the first and second binders contains a fluorine-containing polymer compound.

10. The lithium ion polymer secondary battery according to claim 9, wherein the fluorine-containing polymer compound contained in either or both of the first and second binders is a fluorine-containing polymer compound selected from polytetrafluoroethylene, polychlorotrifluoroethylene, polyvinylidene fluoride, polyvinylidene fluoride-hexafluoropropylene copolymer, and polyvinyl fluoride.

11. The lithium ion polymer secondary battery according to claim 8, wherein the fluorine-containing polymer compound contained in the third binder is a fluorine-containing polymer compound selected from polytetrafluoroethylene, polychlorotrifluoroethylene, polyvinylidene fluoride, polyvinylidene fluoride-hexafluoropropylene copolymer, and polyvinyl fluoride.

12. The lithium ion polymer secondary battery according to claim 8, wherein the modifying material is a compound selected from ethylene, styrene, butadiene, vinyl chloride, vinyl acetate, acrylic acid, methyl acrylate, methyl vinyl ketone, acrylamide, acrylonitrile, vinylidene chloride, methacrylic acid, methyl methacrylate, and isoprene.

13. The lithium ion polymer secondary battery according to claim 8, wherein the thickness of the first and second bonding layers is from 0.5 to 30 μm.

14. The lithium ion polymer secondary battery according to claim 8, which further contains 0.1 to 20% by weight of a dispersant in the first and second bonding layers.

15. The lithium ion polymer secondary battery according to claim 8, wherein a particle size of the conductive material is from 0.5 to 30 μm, a carbon material having a graphitization degree of 50% or more is used as the conductive material, and a weight ratio of the third binder to the conductive material contained in the first and second bonding layers, (third binder/conductive material), is from 13/87 to 50/50.

16. The lithium ion polymer secondary battery according to claim 1, wherein the first conductive materials contained in the first bonding layer and the second conductive materials contained in the second bonding layer, contain a metal or partially oxidized metal having a particle size of 0.1 to 20 μm, and
a weight ratio of the third binder to the first conductive material contained in the first bonding layer, (third binder/first conductive material), and a weight ratio of the third binder to the conductive material contained in the second bonding layer, (third binder/second conductive material), are from 13/87 to 75/25.

17. The lithium ion polymer secondary battery according to claim 16, wherein the first and second conductive materials contain mixtures or alloys of one or more kinds selected from the group consisting of aluminum, steel, iron, nickel, cobalt, silver, gold, platinum, palladium, and partially oxidized material of these metals.

18. The lithium ion polymer secondary battery according to claim 16, wherein an acidic polymer dispersant, a basic polymer dispersant or a neutral polymer dispersant is further added in the first and second bonding layers.

19. The lithium ion polymer secondary battery according to claim 8, wherein the first and second conductive materials contain a metal or partially oxidized metal having a particle size of 0.1 to 20 μm, and
 a weight ratio of the third binder to the first conductive material contained in the first bonding layer, (third binder/first conductive material), and a weight ratio of the third binder to the conductive material contained in the second bonding layer, (third binder/second conductive material), are from 13/87 to 75/25.

20. The lithium ion polymer secondary battery according to claim 19, wherein the first and second conductive materials contain mixtures or alloys of one or more kinds selected from the group consisting of aluminum, steel, iron, nickel, cobalt, silver, gold, platinum, palladium, and partially oxidized material of these metals.

21. The lithium ion polymer secondary battery according to claim 19, wherein an acidic polymer dispersant, a basic polymer dispersant or a neutral polymer dispersant is further added in the first and second bonding layers.

22. An electrode for secondary battery, comprising a current collector and an active material layer formed on one or both surfaces of the current collector via a bonding layer containing a polymer binder,
 wherein a portion of the polymer binder exists in the bonding layer in the form of particles, and
 a volume-mean particle size of the particulate polymer binder is from 1 to 100 μm.

23. The electrode for secondary battery according to claim 22, wherein a main component of the polymer binder is a fluororesin.

24. The electrode for secondary battery according to claim 22, wherein the polymer binder is a compound obtained by graft polymerization of polyvinylidene fluoride and acrylic acid or methacrylic acid.

25. The electrode for secondary battery according to claim 22, wherein a surface density of the particulate polymer binder in a cross section of the bonding layer parallel to the surface of the bonding layer is from 1 to 100/cm$^2$.

26. A secondary battery comprising the electrode for secondary battery according to claim 22.

27. The lithium ion polymer secondary battery according to claim 1, wherein modification with the modifying material is carried out by irradiating either or both of the polymer compounds contained in the first and second binders, or the polymer compound having any of repeating units of the polymer compounds, with radiation and mixing the modifying material with the irradiated polymer compound, thereby to cause graft polymerization.

28. The lithium ion polymer secondary battery according to claim 8, wherein modification with the modifying material is carried out by irradiating either or both of the polymer compounds contained in the first and second binders, or the polymer compound having any of repeating units of the polymer compounds, with radiation and mixing the modifying material with the irradiated polymer compound, thereby to cause graft polymerization.

29. The lithium ion polymer secondary battery according to claim 1, wherein modification with the modifying material is carried out by mixing the modifying material with either or both of the polymer compounds contained in the first and second binders, or the polymer compound having any of repeating units of the polymer compounds, and irradiating the mixture with radiation, thereby to cause graft polymerization.

30. The lithium ion polymer secondary battery according to claim 8, wherein modification with the modifying material is carried out by mixing the modifying material with either or both of the polymer compounds contained in the first and second binders, or the polymer compound having any of repeating units of the polymer compounds, and irradiating the mixture with radiation, thereby to cause graft polymerization.

* * * * *